United States Patent
Phadke

(10) Patent No.: US 9,893,636 B2
(45) Date of Patent: Feb. 13, 2018

(54) SYSTEMS AND METHODS OF OPERATION FOR POWER CONVERTERS HAVING SERIES-PARALLEL MODE ACTIVE CLAMPS

(71) Applicant: Apple Inc., Cupertino, CA (US)

(72) Inventor: Vijay Phadke, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/585,715

(22) Filed: May 3, 2017

(65) Prior Publication Data

US 2017/0244316 A1 Aug. 24, 2017

Related U.S. Application Data

(63) Continuation of application No. 15/042,885, filed on Feb. 12, 2016.

(Continued)

(51) Int. Cl.
*H02M 3/335* (2006.01)
*H02M 1/34* (2007.01)
*H02M 1/00* (2006.01)

(52) U.S. Cl.
CPC ......... *H02M 3/33569* (2013.01); *H02M 1/34* (2013.01); *H02M 3/335* (2013.01);
(Continued)

(58) Field of Classification Search
CPC ............... H02M 1/34; H02M 3/33523; H02M 3/33569; H02M 2001/0058;
(Continued)

(56) References Cited

U.S. PATENT DOCUMENTS

| 5,430,633 A | 7/1995 | Smith |
| 5,883,795 A | 3/1999 | Farrington |

(Continued)

FOREIGN PATENT DOCUMENTS

| CN | 101453168 A | 6/2009 |
| CN | 101562406 A | 10/2009 |

(Continued)

*Primary Examiner* — Kyle J Moody
(74) *Attorney, Agent, or Firm* — Blank Rome LLP

(57) ABSTRACT

Systems and methods for operating improved flyback converters are disclosed, in which leakage energy is returned to the input power source rather than to the output load, while still achieving zero voltage switching (i.e., ZVS) operation. In some embodiments, the improved converters may transfer the energy stored in the leakage inductance to a snubber capacitor(s) at the instant of turning off of the control switch. Further, the improved converter embodiments may also retain the stored energy in the snubber capacitor(s) when the power is being delivered to the load by the secondary circuits. The improved converter embodiments may start the transfer of leakage energy stored in the snubber capacitor(s) to the primary winding once the energy stored in the transformer is delivered to the load. Finally, the improved converter embodiments may intelligently control their active clamp switches such that all leakage inductance energy is returned to the input source.

22 Claims, 18 Drawing Sheets

Related U.S. Application Data

(60) Provisional application No. 62/175,881, filed on Jun. 15, 2015.

(52) U.S. Cl.
CPC ... *H02M 3/33523* (2013.01); *H02M 3/33546* (2013.01); *H02M 2001/0009* (2013.01); *H02M 2001/0058* (2013.01); *H02M 2001/342* (2013.01)

(58) Field of Classification Search
CPC ........... H02M 2001/342; H02M 3/335; H02M 3/33546; H02M 2001/0009
See application file for complete search history.

(56) References Cited

U.S. PATENT DOCUMENTS

| | | | |
|---|---|---|---|
| 6,061,252 A | 5/2000 | Hosotani | |
| 7,864,549 B1 | 1/2011 | Wittenbreder | |
| 8,315,073 B2 | 11/2012 | Matsumoto | |
| 9,240,724 B2* | 1/2016 | Sigamani | H02M 3/285 |
| 2006/0203521 A1 | 9/2006 | Tsuruya | |
| 2007/0263415 A1 | 11/2007 | Jansen | |
| 2009/0097281 A1 | 4/2009 | Lin | |
| 2009/0257254 A1 | 10/2009 | Leu | |
| 2011/0141785 A1 | 6/2011 | Duan | |
| 2014/0029312 A1 | 1/2014 | Telefus | |
| 2014/0043863 A1 | 2/2014 | Telefus | |
| 2014/0226367 A1 | 8/2014 | Hu | |
| 2015/0249397 A1 | 9/2015 | Ogasawara | |

FOREIGN PATENT DOCUMENTS

| | | |
|---|---|---|
| CN | 101702578 A | 5/2010 |
| CN | 103066837 A | 4/2013 |
| CN | 103607108 A | 2/2014 |
| CN | 103746564 A | 4/2014 |
| JP | H03256558 A | 11/1991 |
| JP | H11018426 A | 1/1999 |
| JP | 2000324830 A | 11/2000 |
| JP | 2002199726 A | 7/2002 |
| JP | 2005160218 A | 6/2005 |

* cited by examiner

SYSTEMS AND METHODS OF OPERATION FOR POWER CONVERTERS HAVING SERIES-PARALLEL MODE ACTIVE CLAMPS

TECHNICAL FIELD

This disclosure relates generally to the field of power converters, and, more particularly, to flyback converters with "series-parallel mode" active clamps.

BACKGROUND

In isolated systems, such as flyback converters, the input circuitry (e.g., a primary controller) and the output circuitry (e.g., a secondary controller) are not electrically/galvanically connected to each other. Flyback converters are commonly used as isolated battery chargers and/or front-end AC-DC and DC-DC converters in switch mode power supply applications. For example, a common flyback converter is a buck-boost converter including an inductor that is split to form a transformer. A primary winding of the transformer is coupled to the input circuitry, and a secondary winding of the transformer is coupled to the output circuitry, thus providing the desired isolation between the input circuitry and the output circuitry.

Flyback converters are often preferred for power conversion at low powers, particularly when input voltage variation and output load variations are wide. Their low component count and complexity may be beneficial in incorporating flyback converters into external power adapters used for electronic devices such as cell phones, notebook computers and other consumer electronics equipment.

SUMMARY

Higher efficiency power adapters are advantageous, including when the adapters are plugged into the wall but not connected to a device for charging (called 'stand-by' mode). Additionally, a drive toward miniaturization and portability in the consumer electronic industry push such power converters to be packaged in smaller and smaller volumes, while maintaining certain operating temperatures. Decreasing the size or component count, however, typically makes it harder to achieve efficiency improvements, since the higher frequency operation that may facilitate miniaturization may negatively impact efficiency under certain operation conditions.

Thus, what is needed are improved power converters capable of higher efficiency while also reducing size and/or component count. Described herein are various devices and methods for operating improved flyback converters, in which leakage energy is returned to the input power source rather than to the output load, as is seen in traditional active clamp systems, while still achieving zero voltage switching (ZVS) turn-on operations.

In some embodiments described herein, the improved converters may transfer the energy stored in the leakage inductance to a snubber capacitor at the instant of turning off of the control switch (i.e., as is done with conventional snubbers). Further, the improved converter embodiments may retain the stored energy in the snubber capacitor when the power is being delivered to the load by the secondary circuits. Still further, when all the energy stored in the transformer inductance is delivered to the load, the improved converter embodiments described herein may then start the transfer of leakage energy stored in the snubber capacitor to the primary winding through active clamp switch, i.e., by driving current in the opposite direction. Still further, the improved converter embodiments described herein may adaptively and/or intelligently control the active clamp switch, such that all leakage inductance energy is returned to the input source, while ensuring a minimum energy storage requirement is met for unconditional ZVS operation of the power converter.

DETAILED DESCRIPTION

Figure 1:
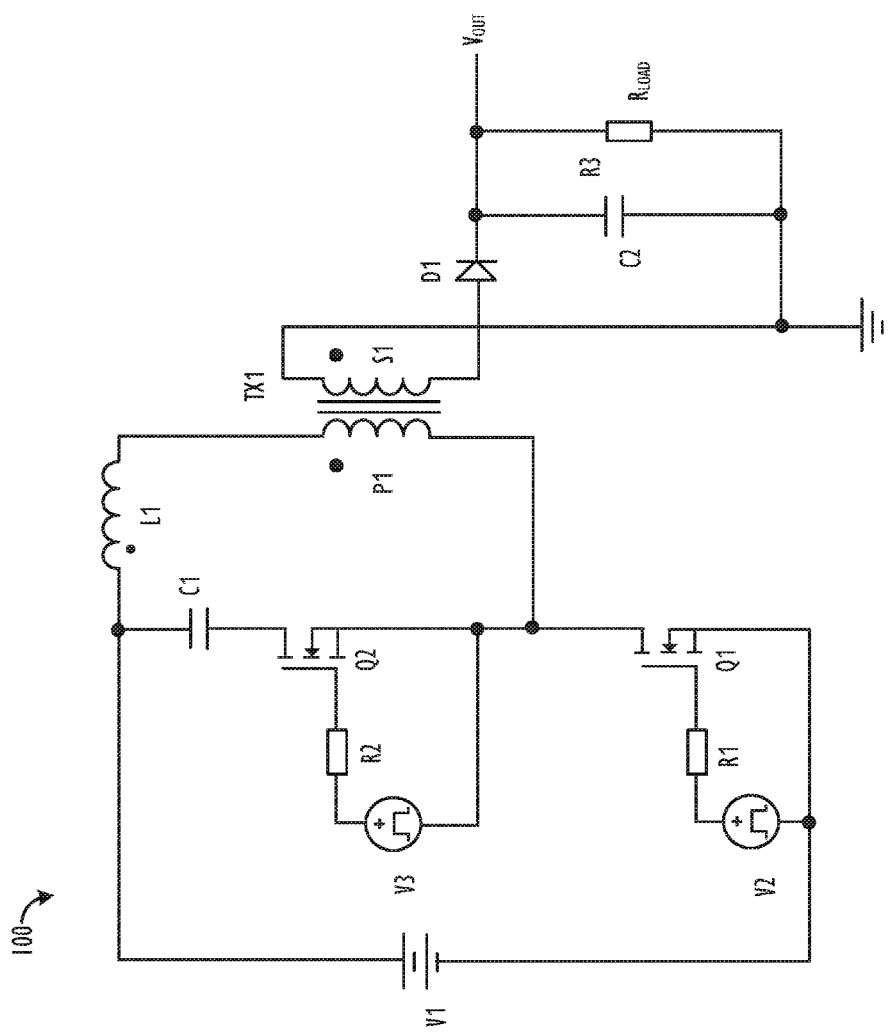
FIG. 1 shows a typical active clamp flyback converter, which is essentially designed to operate in CCM.

Various devices and methods for operating power converters are described herein. More particularly, the embodiments disclosed herein include flyback converters that may operate in one or more of a "variable frequency" mode (in which the switching frequency varies in such a way that leakage inductance energy may be recovered to the output and zero voltage switching transition of the main power switch of the converter is achieved), a "fixed frequency" mode (in which the switching frequency of the flyback converter is fixed), or a "partially-fixed frequency" mode (in which the switching frequency may operate at one of a set number of frequencies based on the input and/or output conditions of the power converter). In some instances, the flyback converters may operate in one of the above modes while achieving zero voltage switching.

Generally, the techniques disclosed herein may allow for increased recovery of leakage inductance energy, which is normally dissipated in traditional flyback converter designs. The enclosed embodiments also allow for high frequency operation, e.g., frequencies in excess of 500 kHz, while simultaneously achieving significant efficiency improvements. This may help to reduce the size of a power converter and thus assist in achieving ultra-compact designs for future power adapters. In some instances, such a converter operating in a fixed frequency mode or a partially-fixed frequency mode, the power converter may further be able to meet common mode noise requirements of certain electronic devices, such as devices having touchscreens, by avoiding frequency bands that may be undesirable for given system requirements.

The techniques disclosed herein are applicable to any number of isolated systems that supply power to electronic systems such as: digital cameras, mobile phones, watches, personal data assistants (PDAs), portable music players, monitors, as well as desktop, laptop, and tablet computers.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

A typical active clamp flyback converter is shown in FIG. 1. The active clamp flyback converter is typically implemented for Continuous Conduction Mode (CCM) operation, however, such flyback converters cannot operate in CCM at all line and load conditions. At lower loads and higher input voltages, for example, the flyback may enter Discontinuous Conduction Mode (DCM), and, in such conditions, traditional active clamp circuits can become very inefficient.

FIG. 1 shows a typical active clamp flyback converter 100, which is essentially designed to operate in CCM. As shown in FIG. 1, the flyback converter 100 may comprise a power source V1, which may be positioned in series with a primary winding P1 of a transformer TX1, and a power switch Q1 coupled between the primary winding P1 and the power source V1. The flyback converter may further comprise active clamp circuitry comprising a series combination of a snubber capacitor C1 and a clamp switch Q2, which may be connected in parallel with the primary winding P1 between the voltage source V1 and the power switch Q1. The transformer TX1 may further comprise a secondary winding S1, which may provide an output voltage $V_{out}$ to power one or more loads (represented by R3 and labeled as $R_{load}$). In some instances, the flyback converter may further comprise a rectifying diode D1 in series with the secondary winding S1 and a filtering capacitor C2 in parallel with the output voltage $V_{out}$. The flyback converter 100 shown in FIG. 1 also comprises gate drive circuitry for power switch Q1 (comprising voltage source V2 and resistor R1) and clamp switch Q2 (comprising voltage source V3 and resistor R2).

Typically, imperfect coupling between the windings of a transformer may result in a parasitic leakage inductance, which may store energy while the power switch Q1 of the flyback converter is closed. This parasitic leakage inductance of transformer TX1 is represented graphically in FIG. 1 as an inductor L1. In some instances, the value of snubber capacitor C1 in the active clamp circuitry may be selected with respect to the value of leakage inductance L1, such that the operating frequency and switching times may achieve zero voltage switching, or soft switching, at turn on. Under certain operating conditions, the snubber capacitor C1 may be used to recover energy stored in the leakage inductance, but this recovery does not occur over all input and output conditions. As a result, the converter may be inefficient at lighter loads, particularly in DCM operation.

During operation, the energy stored in leakage inductance is first transferred to snubber capacitor C1, and is then transferred to the secondary winding S1, (i.e., as soon as the flyback period begins) through the resonant action between the snubber capacitor C1 and the leakage inductance L1. Specifically, energy may be stored in the snubber capacitor C1 from the primary winding S1 through the body diode of clamp switch Q2. Conversely, energy may be discharged (e.g., when the clamp switch Q2 is turned on) from the snubber capacitor C1 into the secondary winding S1 from the primary winding P1, and may further pass through the rectifying diode D1 to the one or more system loads. The resultant peak currents in this energy transfer may be high, and thus significant leakage inductance energy may be lost due to impedances offered by the components in the recovery path.

In some instances, the active clamp as described in FIG. 1 may be controlled in a boundary mode to achieve a zero voltage switching of the power switch Q1 by allowing two separate events of energy transfer to secondary (i.e., output) and primary (i.e., input). During such control, the flyback converters operate on the boundary of DCM and CCM mode, thus resulting in variable frequency converter operation.

In such implementations, the two power control switches (i.e., power switch Q1 and clamp switch Q2) may be operated in such a way that leakage inductance energy is recovered to the output (e.g., Vout) and zero voltage switching transition of the power switch Q1 is achieved—even in DCM operation. The leakage energy may be stored in snubber capacitor C1 after it has charged up to the "reflected output voltage" level, V_OR, i.e., the amount of voltage reflected back from the secondary side to the primary side of the converter while the output diode, D1, is turned ON. The reflected voltage may be defined as V_OUT (i.e., the output voltage) plus Vf_D1 (i.e., the forward voltage drop across the output diode D1) multiplied by $(N_p/N_s)$, where $N_p$ is the number of turns in the primary winding of the transformer and $N_s$ is the number of turns in the secondary winding of the transformer. When the clamp switch Q2 is turned on, snubber capacitor C1 resonates with the leakage inductance L1 and transfers the energy to output through the transformer. Usually, the value of C1 is low and several resonant rings may take place. Once the transformer energy is completely transferred to the load, a reverse current is built up in the primary inductance, as C1 is connected across it through clamp switch Q2. When a predetermined reverse current is built up (e.g., as determined by a control circuit), clamp switch Q2 is turned off. When clamp switch Q2 is turned off, the lower end of the transformer primary winding P1 falls towards ground while discharging the output capacitance C2 at the drain node of power switch Q1. Once the body diode of power switch Q1 starts to conduct while clamping the drain-to-source voltage slightly below ground, the power switch Q1 is turned on in a zero voltage switching (i.e., ZVS) condition. Under this operation, there is no "dead time" in operation since the transformer is either charging or discharging. As a result, the operation of the converter is in "Transition Mode," also known as "Boundary Mode," and the converter runs at variable frequency. Although ZVS operation is achieved, the recovery of leakage inductance energy is minimal for the same reasons as described above.

Series-Parallel Mode (SPM) Active Clamp Converter

Figure 2:
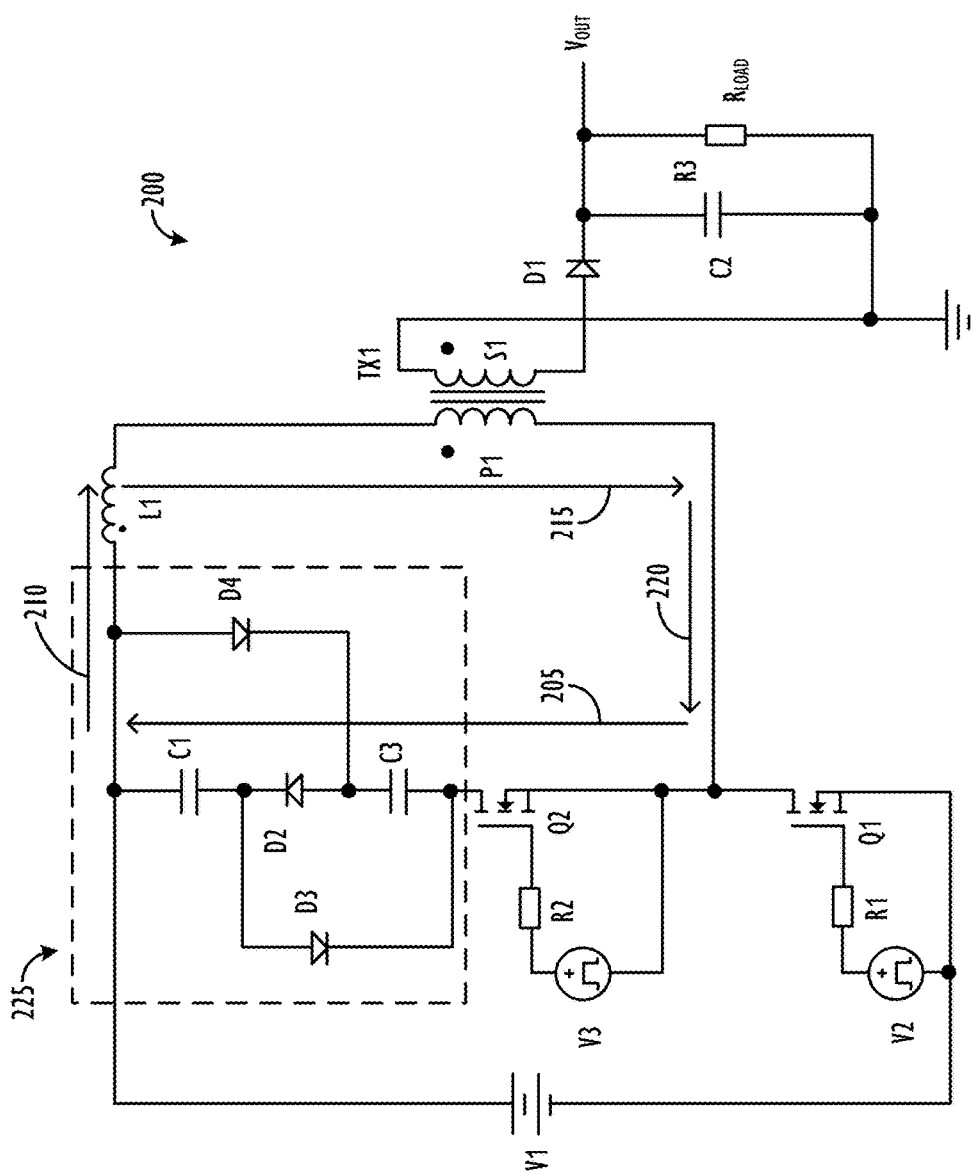
FIG. 2 shows a circuit arrangement of a flyback converter operating in a variable frequency discontinuous current mode and an exemplary charging path for capacitors C1 and C3, in accordance with one or more embodiments.

Referring now to FIG. 2, a circuit arrangement of a flyback converter is shown, in accordance with one or more embodiments, as described here. As shown in FIG. 2, the flyback converter 200 may comprise a power source V1, a power switch Q1, active clamp circuitry comprising an active clamp switch Q2, a first snubber capacitance C1, a second snubber capacitor C3, a first diode D2, a second diode D3, and a third diode D4, and a transformer TX1 having a primary winding P1 and a secondary winding S1. The primary winding P1 may have a leakage inductance (such as discussed above), which is represented in FIG. 2 as inductor L1. The secondary winding S1 of transformer T2 may provide an output voltage $V_{out}$ to power one or more loads (represented by $R_{load}$). In some instances, the flyback converter may further comprise a rectifying diode D1 in series with the secondary winding P2 and a filtering capacitor C2 in parallel with the output voltage $V_{out}$.

As shown in FIG. 2, the power source V1 is connected in series with the power switch Q1 (comprising voltage source V2 and resistor R1), and the active clamp circuitry. The primary winding P1 of the transistor TX1 between the power source V1 and the power switch Q1. The active clamp circuitry may comprise a series combination of the active clamp switch Q2 (comprising voltage source V3 and resistor R2) and a network 225 comprising the first and second snubber capacitors C1 and C3, and the first, second, and third diodes (D2, D3, and D4 respectively). Within network 225, the first diode D2 is connected in series in between the first and second snubber capacitors C1 and C3. The second diode D3 is connected in parallel across the second snubber capacitor C3 and first diode D2; and the third diode D4 is connected in parallel across the first snubber capacitor C1 and first diode D2. The operational roles of the individual elements of the network 225 comprising C1, C3, D2, D3, and D4 will be discussed in further detail below. As stated above, L1 comprises the leakage inductance of the primary coil, P1, of the transformer, TX1. When energy is transferred to the secondary coil, S1, of the transformer, TX1, for delivery to the load, it passes through diode D1 and is stored in capacitor C2. As shown in FIG. 2, the output Voltage may be measured across the load resistance (represented by resistor R3 and labeled $R_{LOAD}$) at the point labeled $V_{OUT}$. The flyback converter 200 shown in FIG. 2 also comprises gate drive circuitry for power switch Q1 (comprising voltage source V2 and resistor R1) and clamp switch Q2 (comprising voltage source V3 and resistor R2). The flyback converter shown in FIG. 2 may be configured to operate in discontinuous conduction mode, such that the converter does not enter continuous conduction mode.

Figure 8:
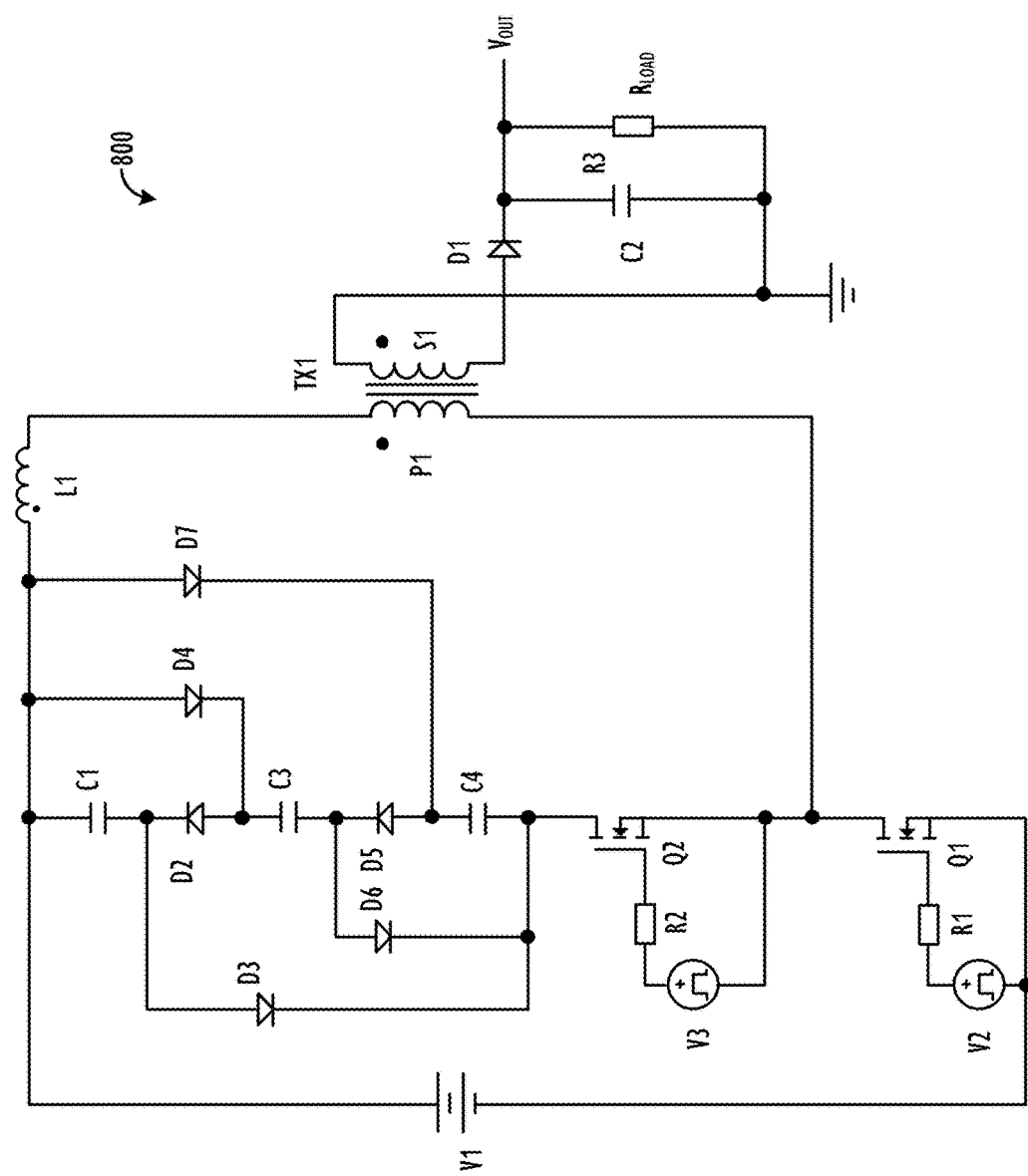
FIG. 8 shows an extension of the series-parallel mode active clamp circuit of FIG. 2 using "n" additional snubber capacitors.

Referring now to FIG. 8, an extension of the series-parallel mode active clamp circuit discussed in detail above with respect to FIG. 2 is shown. The embodiments discussed above use a snubber clamp comprising two capacitors and three diodes. The two snubber capacitors charge in series and discharge in parallel. The core concept of the series-parallel mode active clamp circuit may be extended by the use of 'n' number of snubber capacitors, along with a corresponding number of diodes to achieve all the benefits. For example, as shown in converter circuit 800 of FIG. 8, additional snubber capacitor C4 and diodes D5, D6, and D7 are utilized in the circuit. In particular, additional capacitor C4 is connected in series with snubber capacitors C1 and C3, in between C3 and clamp switch, Q2. As shown in FIG. 8, additional diode D5 is connected in series between C3 and C4; additional diode D6 is connected in parallel across C4 and D5; and additional diode D7 is connected in parallel across C1, C3, D2, and D5. The arrangement of three snubber capacitors shown in FIG. 8 results in all three capacitors charging in series and discharging in parallel. The same principal may be extended to any number "n" of capacitors when used with the appropriate diodes, as shown in FIG. 8.

Figure 9:
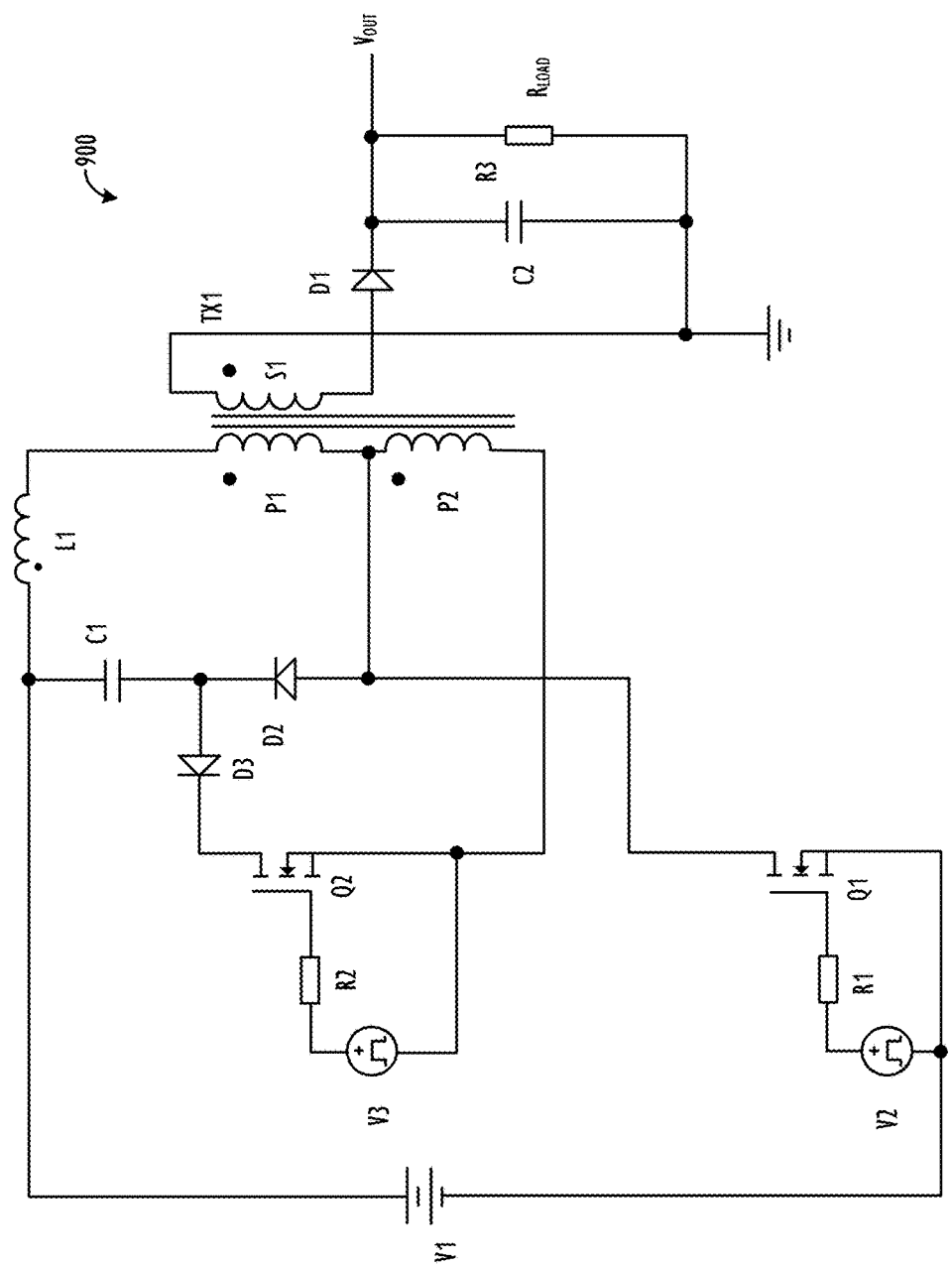
FIG. 9 shows an alternate embodiment of the series-parallel mode active clamp circuit of FIG. 2 using a high side auxiliary winding.

Referring now to FIG. 9, another embodiment of the series-parallel mode active clamp circuit discussed in detail above with respect to FIG. 2, which uses a high side auxiliary winding is shown. According to the embodiment shown in converter circuit 900 of FIG. 9, the second snubber capacitor, C3, and diode D4 are removed from the circuit of FIG. 2. In their place, the diode D2 is instead connected between the primary winding P1 and auxiliary primary winding P2 of the transformer TX1, as well as to power switch Q1 (rather than clamp switch Q2). According to the operation of the circuit 900 shown in FIG. 9, the energy from the leakage inductance is transferred to the snubber capacitor C1 at the turn off transition through D2. This energy does not transfer back in to the transformer, as the diode D3 is reverse biased due to much higher reflected voltage at its cathode node impressed by auxiliary winding. If the two primary windings P1 and P2 have equal turns, and if the reflected voltage across primary P1 is 80V, then the reflected voltage at the source node of clamp switch Q2 would be 160V with respect to Vin. Thus, the current from the snubber capacitor C1 does not transfer energy through clamp switch Q2. When the transformer energy is discharged and it starts to resonate with the equivalent capacitance at the drain node of power switch Q1, energy transfer starts in a manner similar to that presented with respect to FIG. 2 above, i.e., through D3 and Q2. The turns ratio of the primary and auxiliary winding may be varied during circuit optimization.

Figure 10:
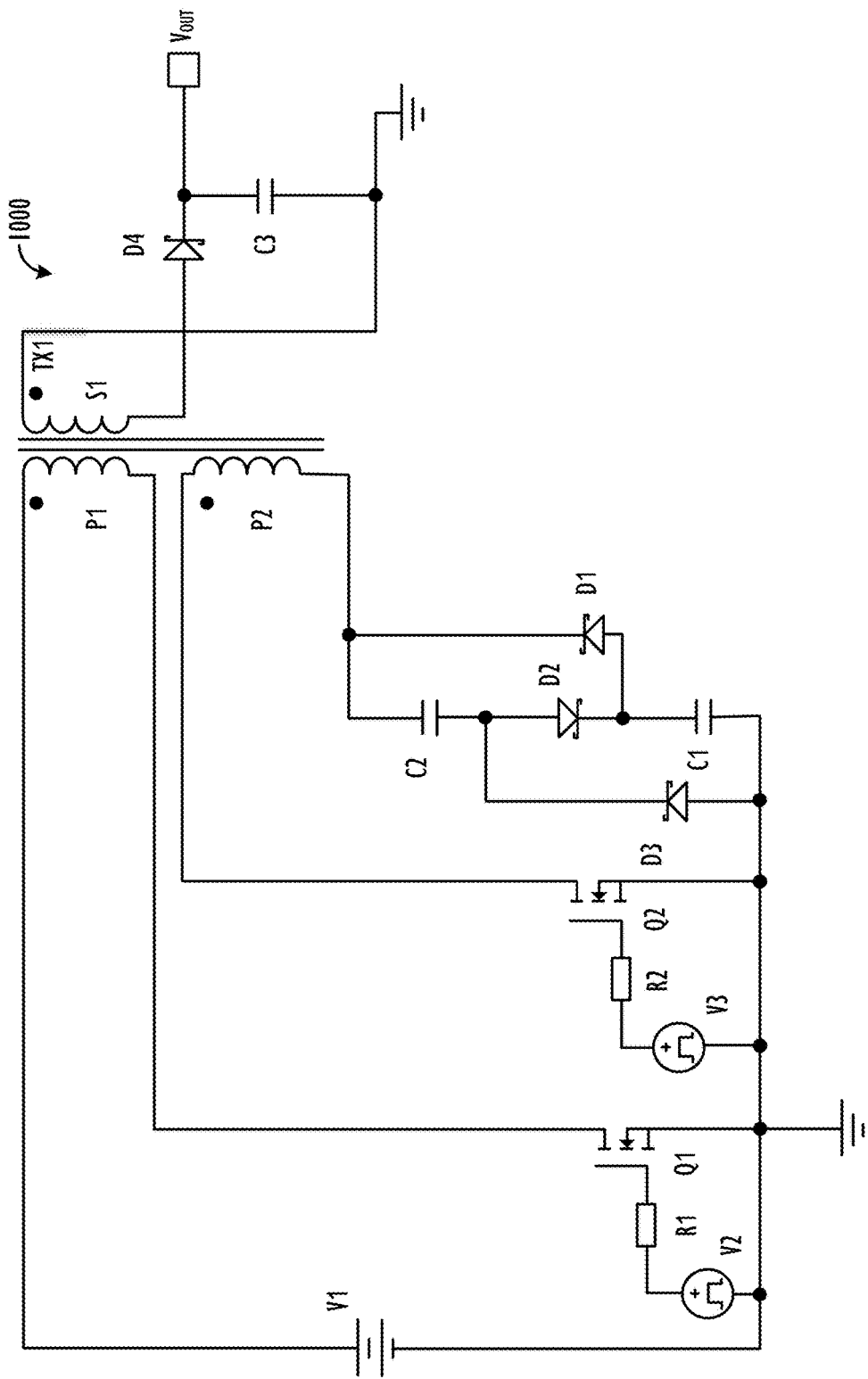
FIG. 10 shows an alternate embodiment of the series-parallel mode active clamp circuit of FIG. 2 using a reflected clamp method.

Referring now to FIG. 10, an another embodiment of the series-parallel mode active clamp circuit discussed in detail above with respect to FIG. 2, which uses a reflected clamp method is shown. According to the embodiment shown in converter circuit 1000 of FIG. 10, a low side auxiliary winding (P2) is used to achieve the same purpose as the series-parallel mode active clamp circuit discussed above with respect to FIG. 9. According to the embodiment shown in FIG. 10, the power switch Q1 is connected to the high side of primary winding, P1, and clamp switch Q2 is connected to the low side of auxiliary primary winding, P2. The reflected clamp comprises snubber capacitor C1, diode D2, and snubber capacitor C2 connected in series; diode D1 connected in parallel across C2 and D2; and diode D3 connected in parallel across C1 and D2. The output diode and output capacitor are relabeled D4 and C3, respectively. The low-side auxiliary winding, P2, may have same number of turns as the primary winding, P1, or a different number. Although the diodes in FIG. 10 are shown as Schottky diodes, such a choice is not strictly necessary, and any suitable diode may be selected for a given implementation. In some embodiments, synchronous rectification may also be used.

There are two pertinent aspects of the alternative embodiment shown in circuit 1000. The first is the recovery of leakage inductance energy, and the second is zero voltage switching of the power switch Q1. This alternate embodiment shown in circuit 1000 achieves the second aspect of ZVS, although the extent of leakage energy recovery depends upon the coupling between the primary winding P1 and the auxiliary winding P2. If the leakage is zero, then it may achieve the same performance as the main embodiment shown in FIG. 2, but such zero leakage is not practical. If P1 and P2 use the same number of turns and are wound in a bifilar fashion, then the leakage is the lowest, and a significant amount of leakage energy can be recovered. One advantage of the embodiment described with reference to FIG. 10 is the simplicity of use, owing to the fact that the drive for the clamp switch Q2 is positioned low side and thus easier to implement through an integrated controller. This may also reduce the overall cost of the control circuit.

The flyback converters described above with respect to FIGS. 2, 8, 9, and 10 may be referred to herein as a "series-parallel mode active clamp converters" and may be configured to operate in one of a number of modes, as will be described in more detail below.

Variable Frequency Operation

Returning to the exemplary embodiment shown in circuit 200 of FIG. 2, during the on time of the power switch Q1, current flows in the primary winding (P1) of the transformer TX1 and stores energy in the primary inductance. When power switch Q1 turns off, at an instance set by the control loop, the leakage energy is transferred to the series connection of two snubber capacitors, namely C1 and C3, through the body diode of clamp switch Q2 and diode D2. A control scheme may be designed such that clamp switch Q2 is turned on when the current is flowing through its body diode during this transition. In some embodiments, the values of C1 and C3 may be chosen to be identical, which results in half the voltage and energy being stored in each capacitor.

The total stored energy in the snubber capacitors is defined as $E_{snubber} = 0.5 \times [(C_1 \times V_{C_1}^2) + (C_3 \times V_{C_3}^2)]$, where C1 and C3 are the values of respective capacitors, and $V_{C_1}$ and $V_{C_3}$ are the voltages across them during the flyback period.

The voltage of each capacitor is half of the reflected output voltage plus half of the induced snubber voltage due to leakage energy. Thus, the total sum of voltages $V_{c1}$ and $V_{c3}$ is always equal or greater than the output reflected voltage when energy is delivered to the load.

Output reflected voltage (V_OR) is given by V_OR= (V_OUT+Vf_D1)×Np/Ns, where Vf_D1 is the forward voltage drop of the rectifier diode D1, and Np/Ns is the transformer turns ratio. Thus, each of the snubber capacitor C1 and C3 would charge to half of the V_OR level, plus an additional voltage level corresponding to half of the leakage inductance energy. Therefore, the value of V_OR stays substantially constant at all loads, while the leakage inductance energy is proportional to the load.

Once all the leakage energy is transferred to the series combination of snubber capacitors C1 and C3 at the initiation of the flyback period, they may instantly be disconnected from the transformer primary, unlike in a traditional active clamp. This is due to the presence of series diode D2. The entire network of C1, C3, D2, D3, and D4 (shown within dashed line 225) is effectively disconnected from rest of the circuit. Since the voltage charge on C2 and C3 is approximately half of the reflected voltage, diodes D3 and D4 are reverse biased. They can conduct only when the energy stored in transformer inductance is delivered to the load completely and when the voltage at the drain node of power switch Q1 falls to a sufficiently lower level to forward bias D3 and D4.

During the time period during which the transformer TX1 is neither charging nor discharging, which may be referred to as "dead time," the primary inductance starts to resonate with the effective capacitance at the drain node of power switch Q1. When the falling voltage across the primary equals that of the voltage across each of the snubber capacitors C1 and C3, they get connected across the primary through Q2 and D3/D4, respectively. The voltage stored in these capacitors starts to build reverse current in the primary winding, i.e., from the bottom end towards the top end, in a resonant manner. During this time, when the voltage across each capacitor falls to the level equal to half of the reflected voltage, all of the stored leakage energy has been transferred to the primary winding. Usually, at higher loads, such leakage energy is substantial, and now, at this voltage level across C1 and C3, the control circuit turns off clamp switch Q2. This interrupts current built up in primary inductance of the transformer and its lower end starts to fall towards ground. Soon, the body diode of the power switch Q1, which may, e.g., be implemented with a MOSFET, latches in and the control circuit turns on power switch Q1 in ZVS mode. For a short period, current continues to flow from source to drain of power switch Q1, operating it as a synchronous rectifier, until all the leakage inductance energy transferred to the primary winding is returned to input source. Then, the current direction in the primary winding reverses, and it initiates the operation of storing energy for power delivery to load in next cycle.

This operation is effectively shown by arrows 205/210/215/220, indicating the charge and discharge paths of snubber capacitors in one cycle. First, C1 and C3 charge in series mode at the start of flyback period while storing leakage inductance energy and clamp switch Q2 is turned on during this charging period. Note that D2 blocks any reverse current through clamp switch Q2 back into the primary winding during the flyback period. The network of C1, C3, D2, D3, and D4 (dashed line 225) is out of action during rest of the flyback period once charging of C1 and C3 is completed.

Figure 3:
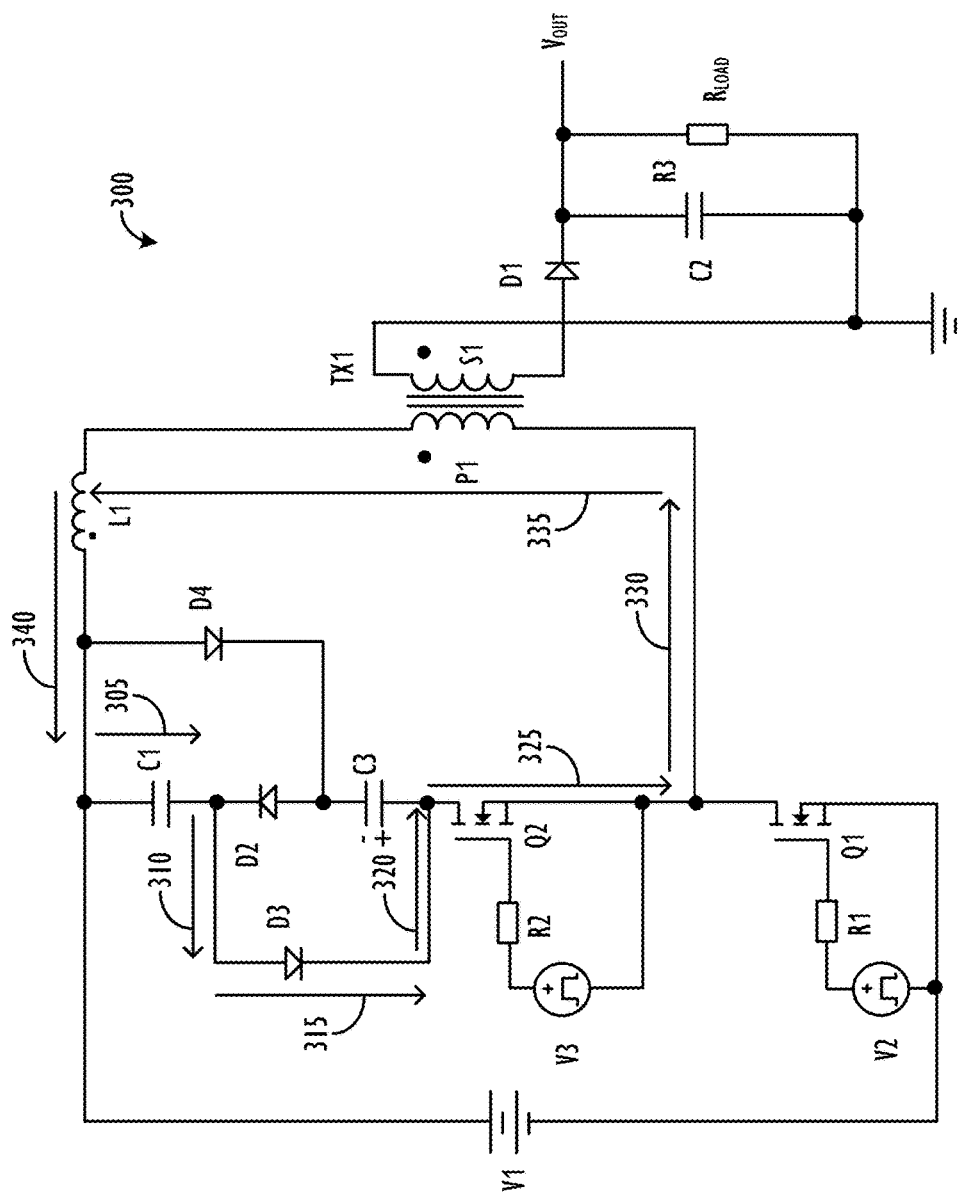
FIG. 3 shows an exemplary discharge path for capacitor C1 of the flyback converter of FIG. 2 operating in a variable frequency mode.

Referring now to FIG. 3, an exemplary discharge path for capacitor C1 of converter 300 is shown. As is shown by the arrows 305-340, C1 is impressed across the primary winding through D3 and Q2, with a positive lower node during the discharging.

Figure 4:
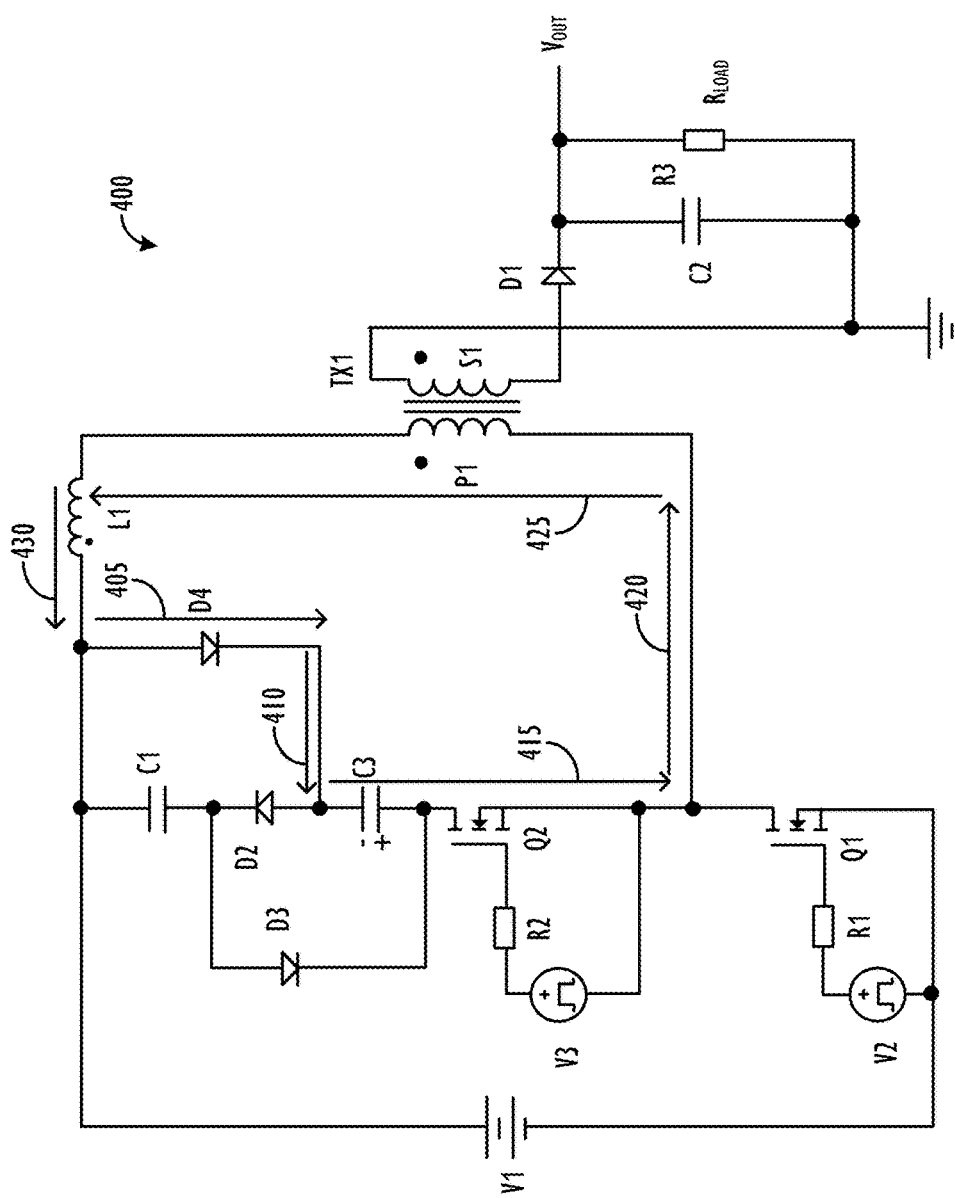
FIG. 4 shows an exemplary discharge path for capacitor C3 of the flyback converter of FIG. 2 operating in a variable frequency mode.

Referring now to FIG. 4, an exemplary discharge path for capacitor C3 of converter 400 is shown. As is shown by the arrows 405-440, C3 is impressed across the primary winding through Q2 and D4, with a positive lower node during the discharging.

It may thus be seen from the discharge paths shown in FIGS. 3 and 4, respectively, that, during discharge, C1 and C3 are effectively connected in parallel across the primary winding and transfer the energy back to primary in parallel mode. The combination of total effective capacitance and primary inductance forms a resonant tank circuit, and the two capacitors C1 and C3 transfer the energy to the primary inductance in resonant manner. Thus, snubber capacitors C1 and C3 charge in series mode and discharge in parallel mode, making this a series-parallel mode active clamp.

Some of the differences between a traditional active clamp and the series-parallel mode active clamp embodiments disclosed herein are now described through an example. Consider a DCM Flyback converter transformer operating on 300V DC input and 5V DC output. The transformer turns ratio, Np:Ns, in this example is 14:1. If a rectifier forward drop is assumed to be 0.7V, the reflected voltage V_OR would be 14×5.7=79.8V, i.e., approximately 80V for simplification purposes. In a traditional active clamp, such as is shown in circuit 100 of FIG. 1, during DCM flyback, the snubber capacitor would be charged, at the least, to this reflected voltage level of 80V. The voltage across the snubber capacitor will rise further at higher loads due to leakage inductance energy dumped in it. In this example, assume the voltage level goes to 100V due to leakage energy and the active clamp switch MOSFET is turned on. When the secondary rectifier starts to deliver the energy to the load, the reflected voltage is 80V, and the snubber capacitor voltage is 100V. Thus, a reverse 20V (i.e., 100V−80V) is applied across the leakage inductance through clamp switch Q2. Resonance occurs between the snubber capacitor and leakage inductance, and a large amount of current flows in the transformer primary from the bottom end to the top end, thus transferring this energy to the secondary side by "forward transformer action," due to the polarity of the windings. As the leakage inductance value is very low, this resonant frequency is high, and multiple resonances can result, sending energy back and forth in the snubber capacitor—and, in the process, causing high power losses in the primary and secondary winding resistances and clamp switch Q2.

By contrast, in the improved embodiments disclosed herein, the total charge in the series capacitance will be identical for the same design parameters, assuming the combined value of capacitance is same as in the original reference. In other words, C1 and C3 have twice the capacitance but half the voltage rating, so as to achieve equivalent capacitance as the referenced prior art embodiments. However, after charging to 100V, the voltage on each capacitor is 50V, and they individually operate in parallel as shown in FIGS. 3 and 4, depicting the discharge paths. Thus, these two capacitors, acting in parallel, each charged to 50V are connected to an 80V reflected voltage on the bottom end of the transformer. This causes series diodes D3 and D4 to be reverse biased, and no current flows from the snubber capacitors, even if clamp switch Q2 is turned on.

When the energy stored in the magnetizing inductance of the flyback converter is completely delivered to the load, the bottom end of the transformer starts to fall down from the level of Vin+V_OR (300V+80V=380V) towards the Vin level, the same as with any DCM flyback ringing in dead time. In this transition, when the bottom node of transformer primary reaches (Vin+$V_{C1}$) or (Vin+$V_{C3}$), or approximately 350V in this case, the lower end of the primary is 50V higher than the upper end, and C1/C3 get connected across the primary in parallel, with the positive end at the bottom of primary winding and the negative end at top. Next, the current starts to flow from capacitors to primary winding in a resonant manner, but, this time, the resonant frequency is much lower, dictated by the tank circuit of primary magnetizing inductance and snubber capacitance. This starts to build current in the primary winding in a reverse direction (i.e., from bottom end to top end) as compared to power storage in the active period. When each capacitor discharges from 50V to 40V (i.e., from Vpeak to ½ V_OR), the leakage inductance energy transfer to the primary is complete. Next, if the current built up in the primary in the reverse direction is enough to discharge the capacitance at the drain node of power switch Q1 completely in the required transition time, the clamp switch Q2 is turned off. Finally, power switch Q1 is turned on in ZVS mode and the operation may be repeated.

As explained above, the voltage charge on the snubber capacitors essentially moves between Vpeak to ½ V_OR, i.e., from full load level to a defined lower load level, when the current built up in the primary winding by the stored leakage inductance energy is not sufficient to achieve ZVS for power switch Q1. From his load level and below, C1 and C3 are allowed to discharge further, i.e., below ½ V_OR level, until adequate current is built in primary inductance to achieve ZVS.

Thus, two conditions should be met to turn off clamp switch Q2: condition 1.) The voltage across each snubber capacitor falls to a predetermined threshold, e.g., ½ V_OR level. In some embodiments, this predetermined threshold may be higher than the ½ V_OR level, e.g., if the components in the converter are able to handle the extra voltage stress. In other embodiments, the predetermined threshold may be lower than the ½ V_OR level, e.g., if marginally lower performance is acceptable in a given implementation. (This condition may be enforced by monitoring the voltage across the capacitor directly or indirectly. For example, falling voltage across an auxiliary bias winding may be monitored to detect corresponding voltage across snubber capacitor. If the auxiliary winding delivers 12V bias, e.g., then, assuming the predetermined threshold was set to the ½ V_OR level, the winding voltage would have to fall to at least 6V level before clamp switch Q2 was turned off.) Condition 2.) A minimum current, e.g., preset in the design, must be built up in the primary winding of the transformer. This can be achieved by sensing reverse current in the primary winding P1 or clamp switch Q2.

Both conditions above may also be met in a much simple manner, i.e., by calibrating the power converter. Once the power converter is designed and built, it may be calibrated to check the lowest load level when leakage energy is adequate to achieve ZVS. Thus, clamp switch Q2 may be kept on until the voltage on C1 and C3 falls to ½ V_OR level down to this load. At load levels lower than this, the discharge voltage threshold may be lowered progressively based on calibration data. When both conditions are met, clamp switch Q2 may be turned off, followed by a ZVS turn on of power switch Q1, and next the power cycle may begin.

This ensures ZVS operation across the entire input voltage and output load range—while keeping circulation of energy at an optimum level. The described operation of the flyback converter embodiments above essentially results in a "variable frequency" operation, wherein the turn on of power switch Q1 and turn off of clamp switch Q2 are dictated by operating conditions—and not by a fixed clock.

Exemplary Waveforms for Variable Frequency Operation

Figure 5:
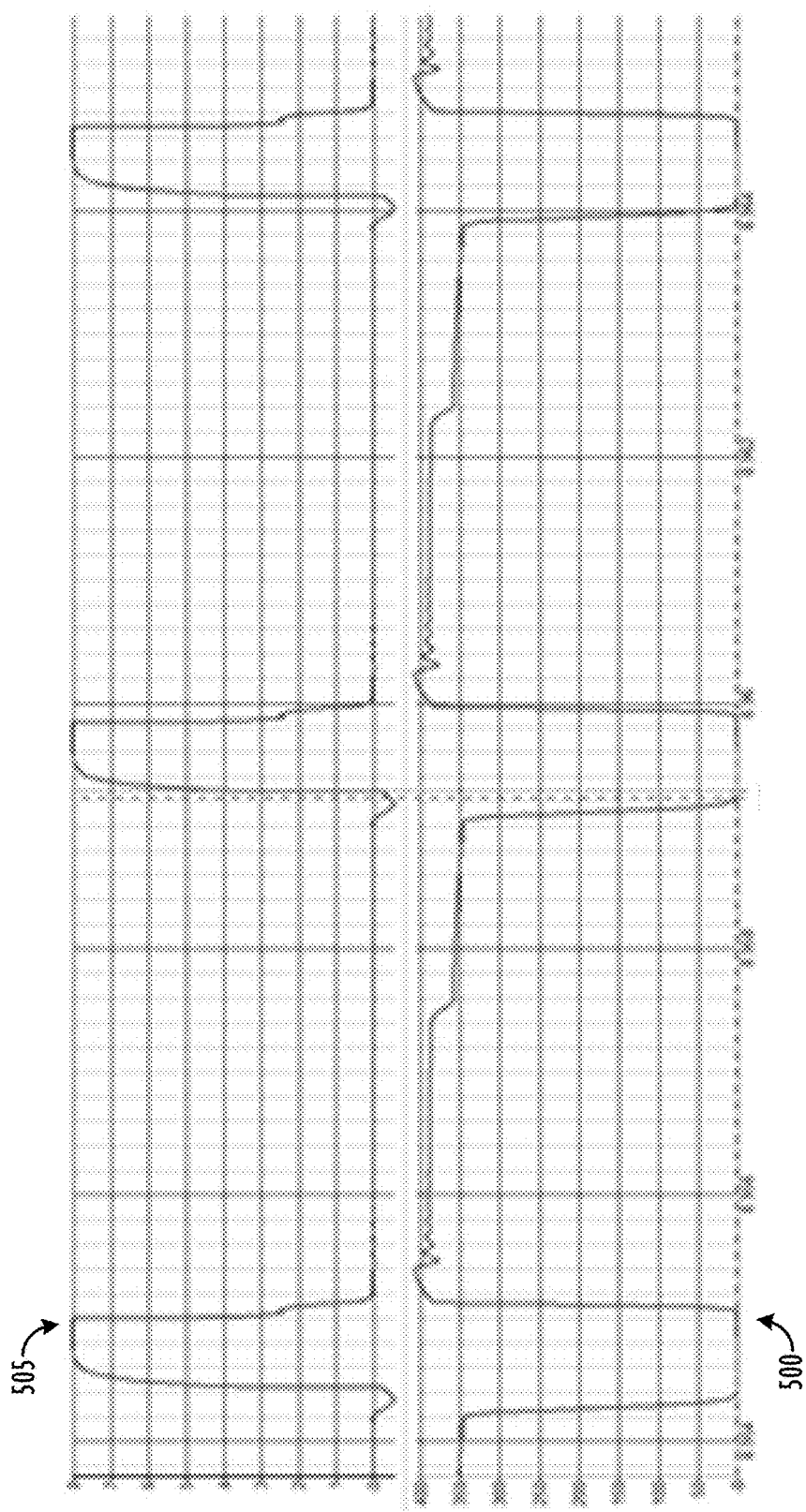
FIG. 5 shows waveforms illustrating zero voltage turn on for the flyback converter of FIG. 2 operating in a variable frequency mode.

Referring now to FIG. 5, waveforms illustrating zero voltage 'turn on' are shown. In particular, waveform 500 represents Vds Q1, i.e., the drain-to-source voltage of the power switch Q1, and waveform 505 represents VgsQ1, i.e., the gate-to-source voltage of the power switch Q1. From FIG. 5, it may clearly be seen in the waveforms that the drain-to-source voltage (500) is below the zero voltage level when the gate-to-source voltage (505) reaches the turn on threshold of power switch Q1.

Figure 6:
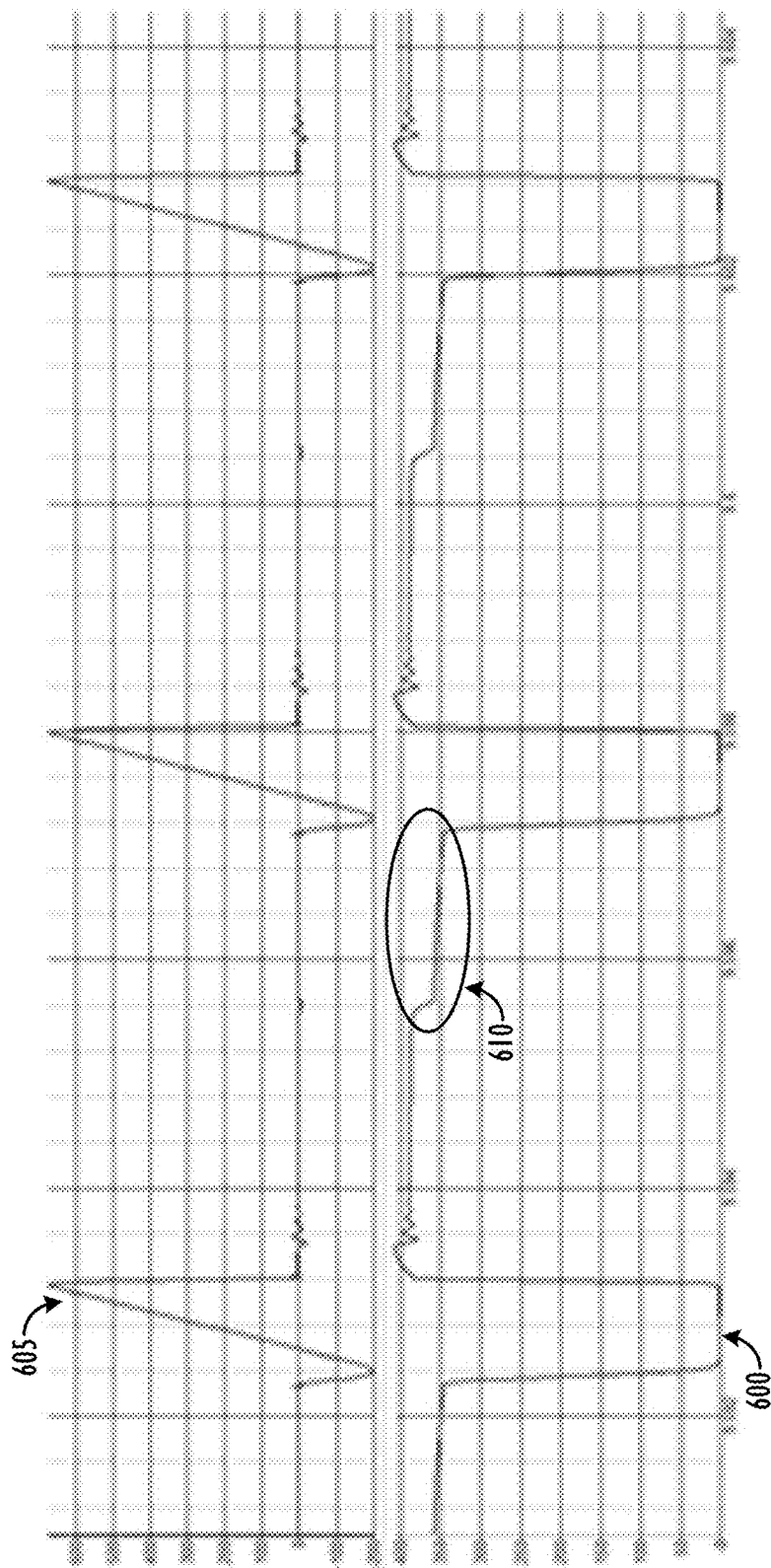
FIG. 6 shows waveforms illustrating the reverse current in power switch Q1 of the flyback converter of FIG. 2 operating in a variable frequency mode.

Referring now to FIG. 6, waveforms illustrating the reverse current in power switch Q1, which has discharged the reflected capacitance at its drain node, are shown. In particular, Vds Q1 (waveform 600) and IdQ1, i.e., the current flowing through the power switch Q1, (waveform 605) show the reverse current in power switch Q1, which has discharged the reflected capacitance at its drain node. The ringing during dead time, as is commonly seen in DCM flyback converters, is eliminated, as is illustrated by the sloping, flat area 610 in waveform 600.

Figure 7:
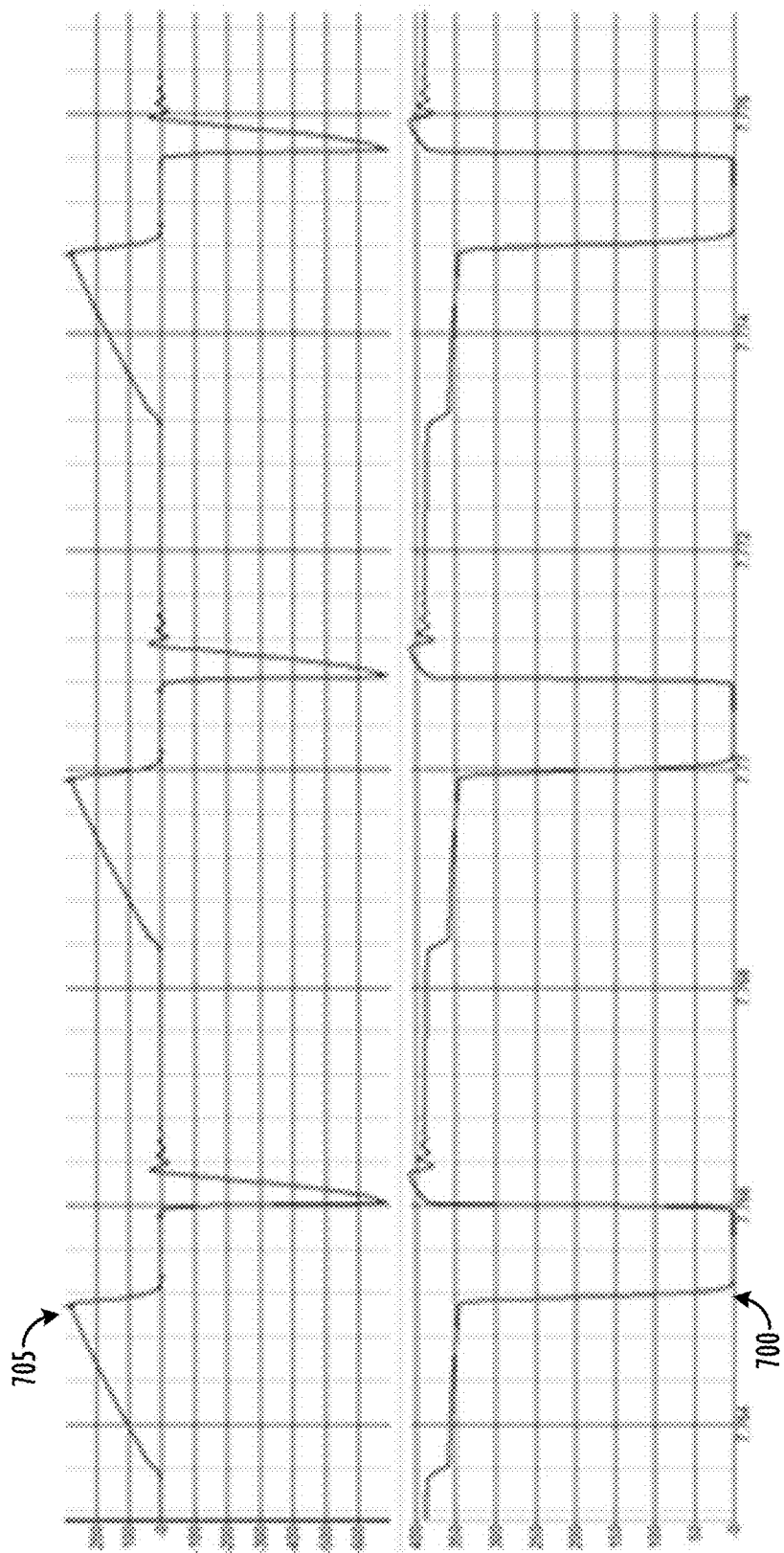
FIG. 7 shows waveforms illustrating current transfer to the active clamp at the time of turn off of power switch Q1 of the flyback converter of FIG. 2, as well as the discharge current after the end of the flyback period or during the dead time.

Referring now to FIG. 7, waveforms illustrating current transfer to the active clamp at the time of turn off of power switch Q1, as well as discharge current after the end of the flyback period or during the dead time are shown. Vds_Q1 is represented by waveform 700, and Id_Q2, i.e., the current flowing through the clamp switch Q2, is represented by waveform 705.

Fixed Frequency Operation

The embodiments described up to this point teach high efficiency variable frequency flyback converters that operate in a variable frequency mode. Although high efficiency power conversion is desirable in many implementations, there are some constraints placed upon power conversion by the specific features used in the devices that are to be powered by such converters. For example, the "multi-touch" technology used with modern mobile phones and tablet devices demand very low common mode noise injection in specific frequency bands. This requirement discourages the operation of the converter in such frequency bands—or at least the fundamental switching frequency of the converter from being in these bands. As a result, although the variable frequency mode converter embodiments described above provide very high efficiency, they may not be able to be used in certain power adapters, such as those that are expected to drive systems that are sensitive to specific frequency bands. Thus, the embodiments described below comprise systems having a modified method of operation that allow for high efficiency discontinuous mode flyback converter designs at fixed operating frequencies.

Implementing active clamps for Continuous Conduction Mode (CCM) flyback converter is known in the art. However, such flyback converters are often unable to operate in CCM at all line and load conditions. At lower loads and higher input voltages, e.g., the flyback invariably enters DCM, and, in such conditions, operating as a traditional active clamp can be very inefficient. As described above, FIG. 1 shows a typical active clamp flyback converter, which is essentially designed to operate in CCM.

In addition to the properties of the circuit of FIG. 1 described above, it should also be noted that, in DCM mode, after discharging all the leakage energy stored in the snubber capacitor, the reflected voltage charge stored in it is directly impressed across the primary winding through clamp switch Q2. Thus, after delivering all the energy stored in the transformer to the load, the reverse current builds in the primary inductance at a rapid rate. This reverse current can be substantial at light loads and can degrade efficiency due to circulating current.

The fixed frequency embodiments of the flyback converters with series-parallel mode active clamp described herein focus on achieving high efficiency power conversion, while meeting the multi-touch common mode noise requirements imposed by certain electronic devices. The principal of operation of the fixed frequency embodiments is similar to the operation of the variable frequency embodiments, but with several changes.

The core principles of operation of the fixed frequency embodiments include the following:

1.) Transfer the energy stored in the leakage inductance to a snubber capacitor at the instance of turn off of the control switch (i.e., similar to the behavior of conventional snubbers).

2.) Retain this stored energy in the snubber capacitor when the power is being delivered to the load by the secondary circuits.

3.) When all the energy stored in the transformer inductance has been delivered to the load, start the transfer of leakage energy stored in the snubber capacitor to the primary winding, i.e., through the active clamp switch, by driving current in the opposite direction.

4.) Continue to discharge the snubber capacitors even after the stored leakage energy is transferred back to the primary winding until a fixed, predetermined instance of turn off (as dictated by the switching period of the operation) and impress no more than half (or whatever the desired threshold has been selected to be) of the reflected voltage across the primary inductance during such period.

5.) Turn off the active clamp switch at a pre-determined time before the initiation of the next switching cycle.

Figure 11:
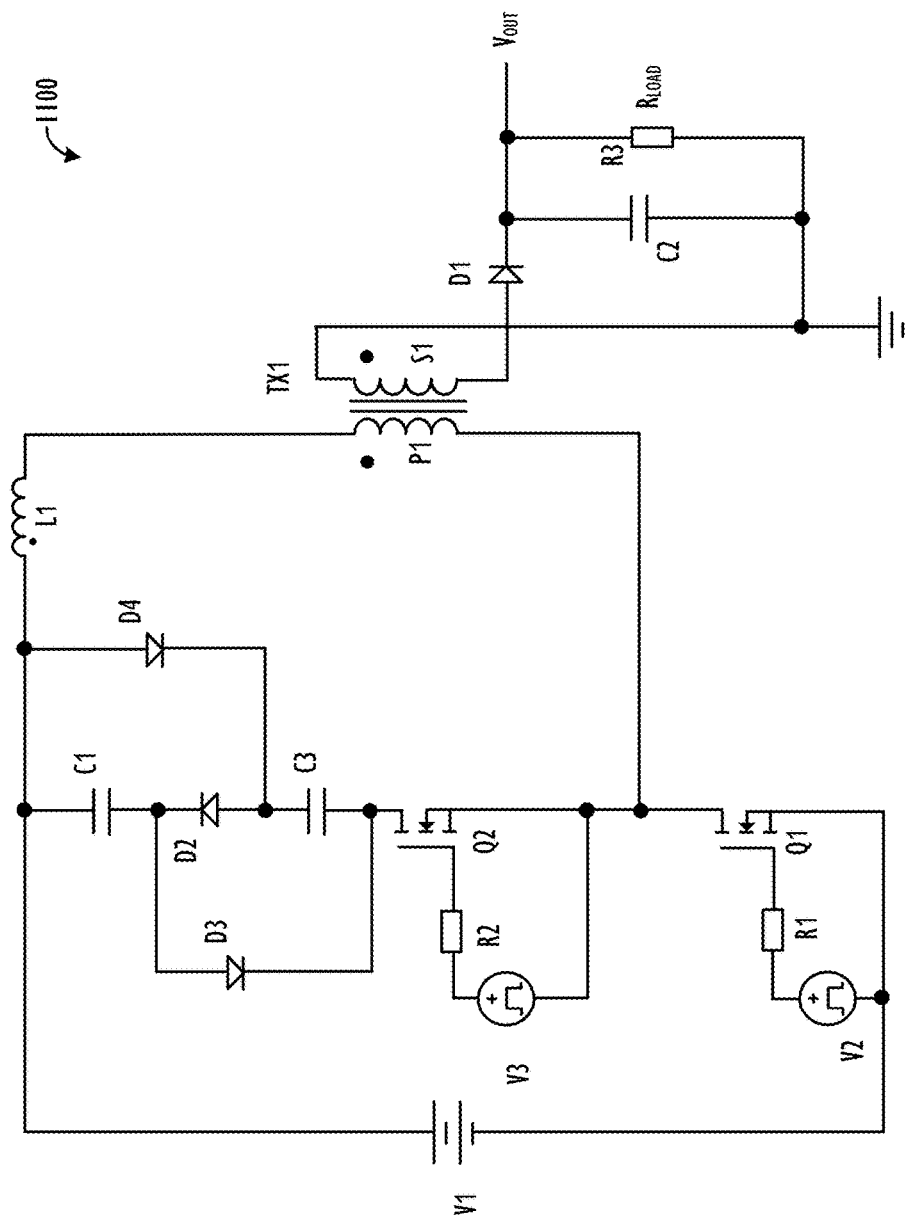
FIG. 11 shows a preferred embodiment of a fixed frequency active clamp flyback converter operating in discontinuous mode, in accordance with one or more embodiments.

FIG. 11 shows a preferred embodiment of a fixed frequency active clamp flyback converter 1100, configured to operate in discontinuous conduction mode, according to some embodiments. As with FIG. 2 described above, Q1 is the power switch, Q2 is the clamp switch, C1 and C3 are the snubber capacitors, and L1 represents the leakage inductance. The topology and theory of operation of the circuit of FIG. 11 is nearly identical to the theory of operation of the circuit of FIG. 2 described above, but the method of operation and resulting behaviors of the two circuits is different.

In particular, after all the stored energy in the transformer inductance is delivered to the output, the primary inductance starts to resonate with the effective capacitance at the drain node of power switch Q1, which causes voltage at that node to fall. When this falling voltage across the primary winding equals that of the voltage across each of the snubber capacitors, C1 and C3, they are connected across the primary winding through Q2 and D3/D4, respectively. The charge stored in the snubber capacitors starts to build reverse current in the primary winding, from the bottom end toward top end in a resonant manner. During this time, when the voltage across each capacitor falls to the level equal to half of the reflected voltage (or whatever the desired threshold has been selected to be), all of the stored leakage energy has been transferred to the primary winding. This reverse current continues to build by drawing energy stored in the snubber capacitors. In traditional active clamps, the entire reflected voltage is impressed upon the primary inductance. However, in the improved embodiments disclosed herein, after the transfer of the leakage energy, the voltage impressed upon the primary inductance is halved in value, and, thus, the resultant circulating current is much lower.

In fixed frequency flyback converters, the total switching period is fixed, and the 'on time' of power switch Q1 may be controlled by an error amplifier, based on the load demand. The control gate drive for clamp switch Q2 may be set up such that it is turned off a short time period before the next turn on instance of power switch Q1, e.g., as determined by a pulse width modulation (PWM) engine. This short delay period may be set such that it is adequate to allow the drain-to-source voltage of power switch Q1 to fall to zero and transfer the current to its intrinsic body diode. When clamp switch Q2 is turned off, it interrupts the reverse current built up in the primary winding and forces the drain node of power switch Q1 to fall towards ground. The time delay is set to achieve zero voltage switching of power switch Q1 at all desired input and load conditions, as required by the design needs.

Thus, power switch Q1 may be turned on by the PWM control in the following switching cycle when its body diode is conducting the reverse current. For a short time, power switch Q1 operates as a synchronous rectifier (SR) until the current polarity in it reverses and positive current stats to build in the primary winding inductance to meet load demand.

Figure 12:
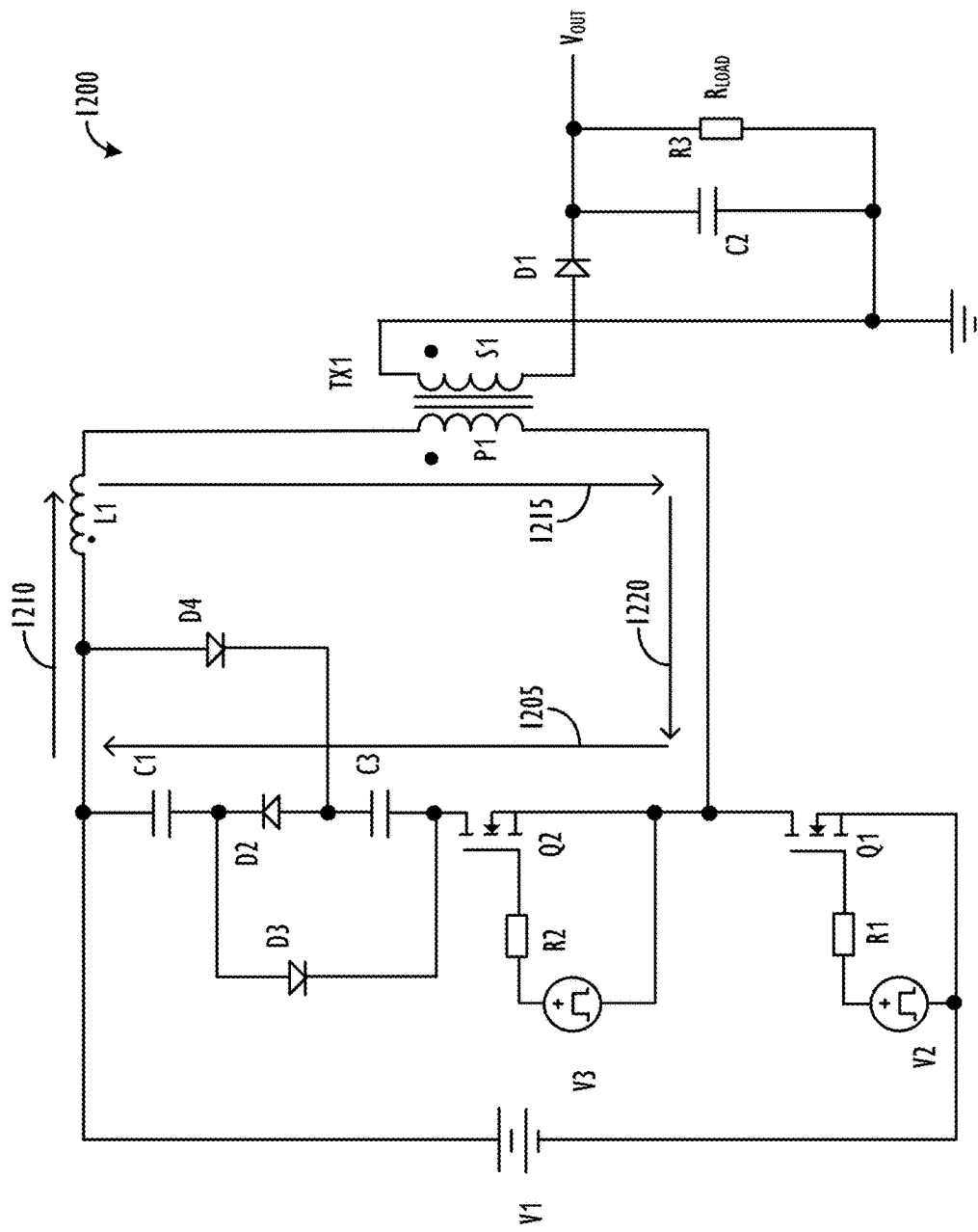
FIG. 12 shows a circuit arrangement of a flyback converter operating in a fixed frequency discontinuous current mode and an exemplary charging path for capacitors C1 and C3, in accordance with one or more embodiments.

This operation is effectively shown in circuit 1200 of FIG. 12, by arrows 1205/1210/1215/1220, indicating the charge paths of snubber capacitors in one cycle. In particular, C1 and C3 charge in series mode at the start of the flyback period while storing leakage inductance energy, and clamp switch Q2 is turned on during this charging period. Note that D2 blocks any reverse current through clamp switch Q2 back into the primary winding during the flyback period. The network of C1, C3, D2, D3, and D4 is out of action during rest of the flyback period, once the charging of C1 and C3 is completed.

Figure 13:
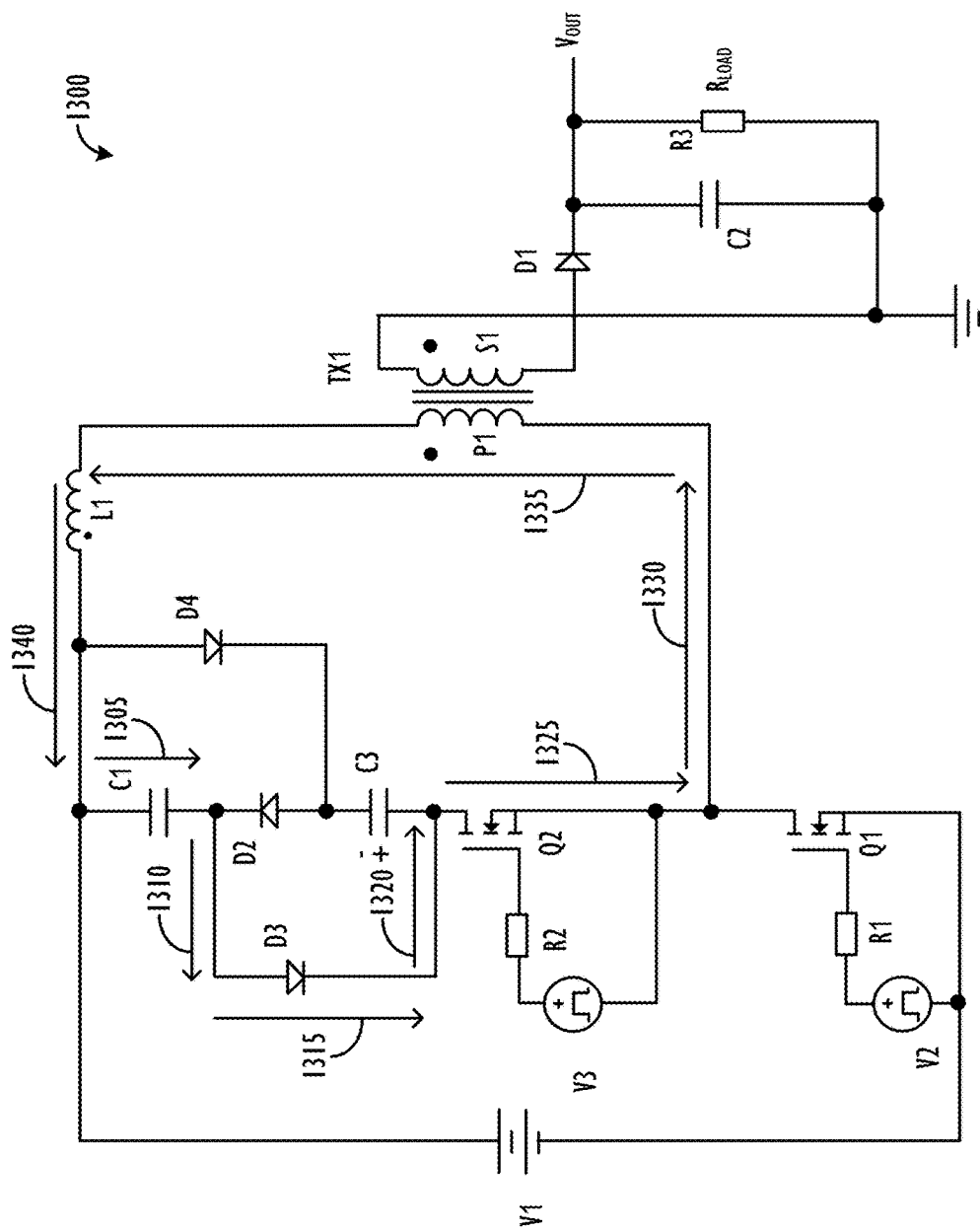
FIG. 13 shows an exemplary discharge path for capacitor C1 of the flyback converter of FIG. 12 operating in a fixed frequency mode.

Referring now to FIG. 13, an exemplary discharge path for snubber capacitor C1 in converter circuit 1300 is shown. As is shown by the arrows 1305-1340, C1 is impressed across the primary winding through D3 and Q2, with a positive lower node.

Figure 14:
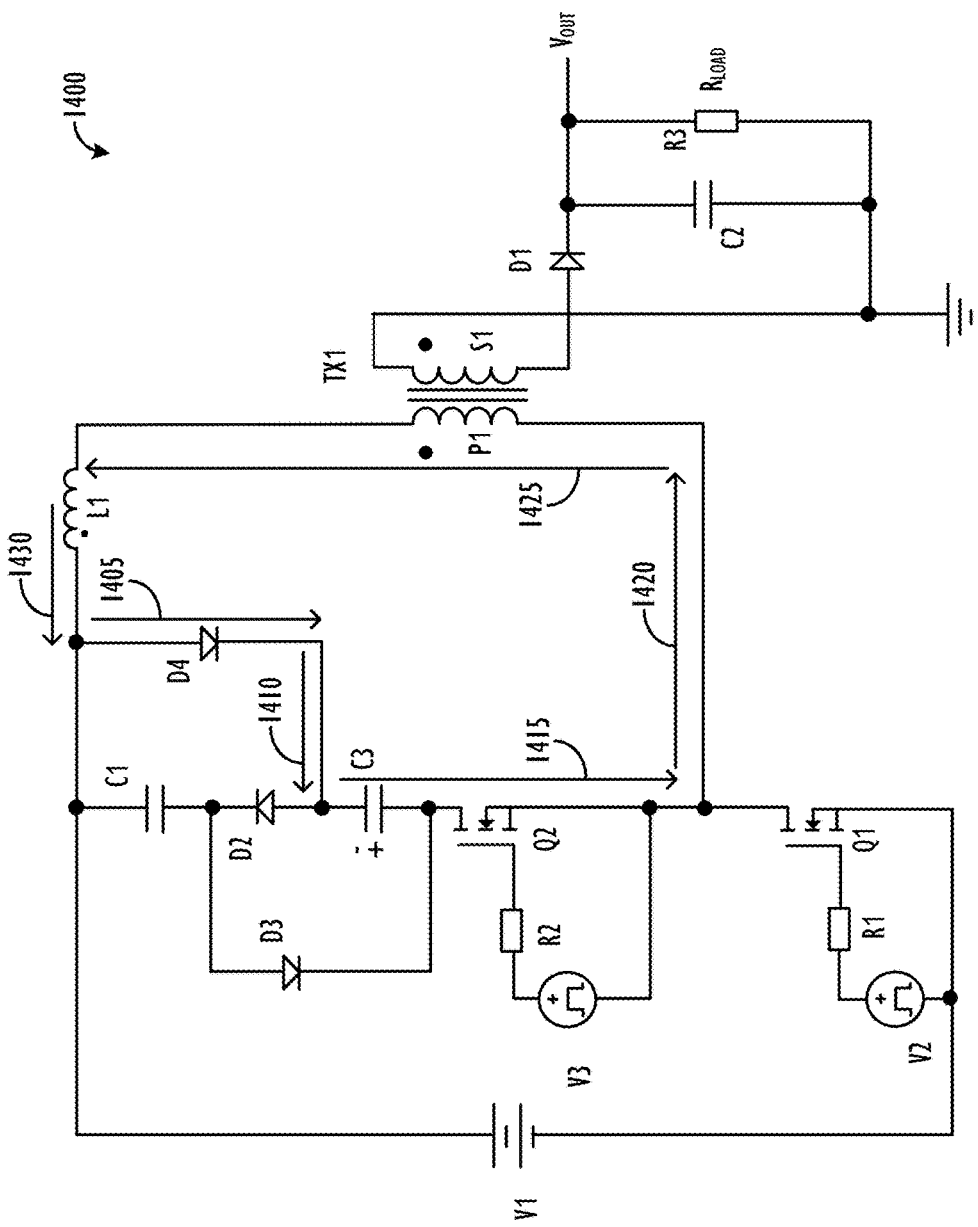
FIG. 14 shows an exemplary discharge path for capacitor C3 of the flyback converter of FIG. 12 operating in a fixed frequency mode.

Referring now to FIG. 14, an exemplary discharge path for snubber capacitor C3 in converter circuit 1400 is shown. As is shown by the arrows 1405-1430, C3 is impressed across the primary winding through Q2 and D4, with a positive lower node.

It may thus be seen from the discharge paths shown in FIGS. 13 and 14, respectively, that, during discharge, C1 and C3 are effectively connected in parallel across the primary winding and transfer the energy back to primary in parallel mode. Thus, snubber capacitors C1 and C3 charge in series mode and discharge in parallel mode, making this a series-parallel mode active clamp.

With traditional active clamps, when all the energy stored in the transformer is delivered to the output, the snubber capacitor starts to drive reverse current in the primary winding. The voltage impressed upon the primary is thus equal to the reflected voltage. By contrast, in the improved fixed frequency embodiments disclosed herein, the total charge in the series capacitance will be identical for the same design parameters, assuming the combined value of capacitance is the same as in the original reference. In other words, C1 and C3 have twice the capacitance but half the voltage rating, so as to achieve the same equivalent capacitance as prior art charger designs without the benefit of the improvements described herein.

However, after charging to an exemplary voltage of 100V, the voltage on each capacitor C1/C3 is 50V, and they individually operate in parallel, as shown in FIGS. 13 and 14, depicting the discharge paths. Thus, these two capacitors, acting in parallel, each charged to 50V, are connected to 80V reflected voltage on the bottom end of the transformer. This causes series diodes, D3 and D4 to be reverse-biased, and no current flows from the snubber capacitors, even if clamp switch Q2 is turned on. When the energy stored in the magnetizing inductance of the flyback converter is completely delivered to the load, the bottom end of the transformer starts to fall down from the level of Vin+V_OR (e.g., 300V+80V=380V) towards the Vin level, similar to any DCM flyback converter ringing in dead time. In this transition, when the bottom node of transformer primary reaches ($V_{in}+V_{C1}$) or ($V_{in}+V_{C3}$), or approximately 350V in this case, the lower end of the primary is 50V higher than the upper end, and C1/C3 get connected across the primary in parallel, with positive end at the bottom of primary winding and negative end at top.

Next, the current starts to flow from the capacitors to the primary winding in a resonant manner, but, this time, the resonant frequency is much lower, dictated by the tank circuit of primary magnetizing inductance and snubber capacitance. This starts to build current in the primary winding in the reverse direction (i.e., from bottom end to top end), as compared to power storage in active period. When each capacitor discharges from 50V to 40V (i.e., from Vpeak to ½ V_OR), the leakage inductance energy transfer to the primary is complete. The current further continues to build in the primary winding, but now the voltage impressed upon the primary winding is only 40V, i.e., half of that experienced in traditional active clamp of FIG. 1. As explained above, clamp switch Q2 is turned off for a short time that is predetermined in the design before next turn on instance of power switch Q1, in order to allow the drain node of power switch Q1 to fall below zero. Finally, power switch Q1 is turned on in ZVS mode, and the entire operation may be repeated.

Exemplary Waveforms for Fixed Frequency Operation

Figure 15:
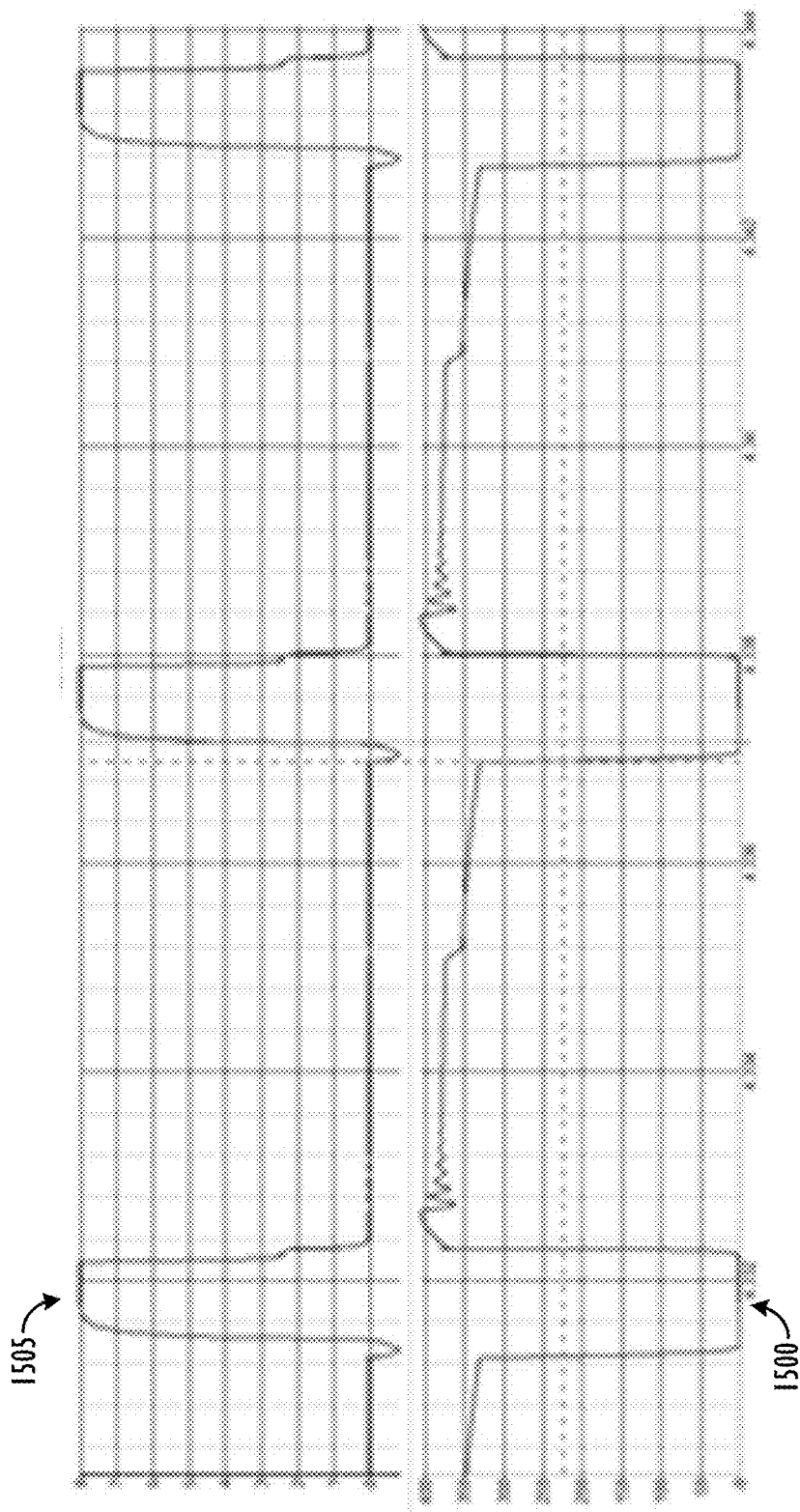
FIG. 15 shows waveforms illustrating Zero Voltage 'turn on' for the flyback converter of FIG. 2 operating in a fixed frequency mode.

Referring now to FIG. 15, waveforms illustrating zero voltage 'turn on' are shown. In particular, waveform 1500 represents Vds Q1, i.e., the drain-to-source voltage of the power switch Q1, and waveform 1505 represents VgsQ1, i.e., the gate-to-source voltage of the power switch Q1. From FIG. 15, it may clearly be seen in the waveforms that the drain-to-source voltage (1500) is below the zero voltage level when the gate-to-source voltage (1505) reaches the turn on threshold of power switch Q1.

Figure 16:
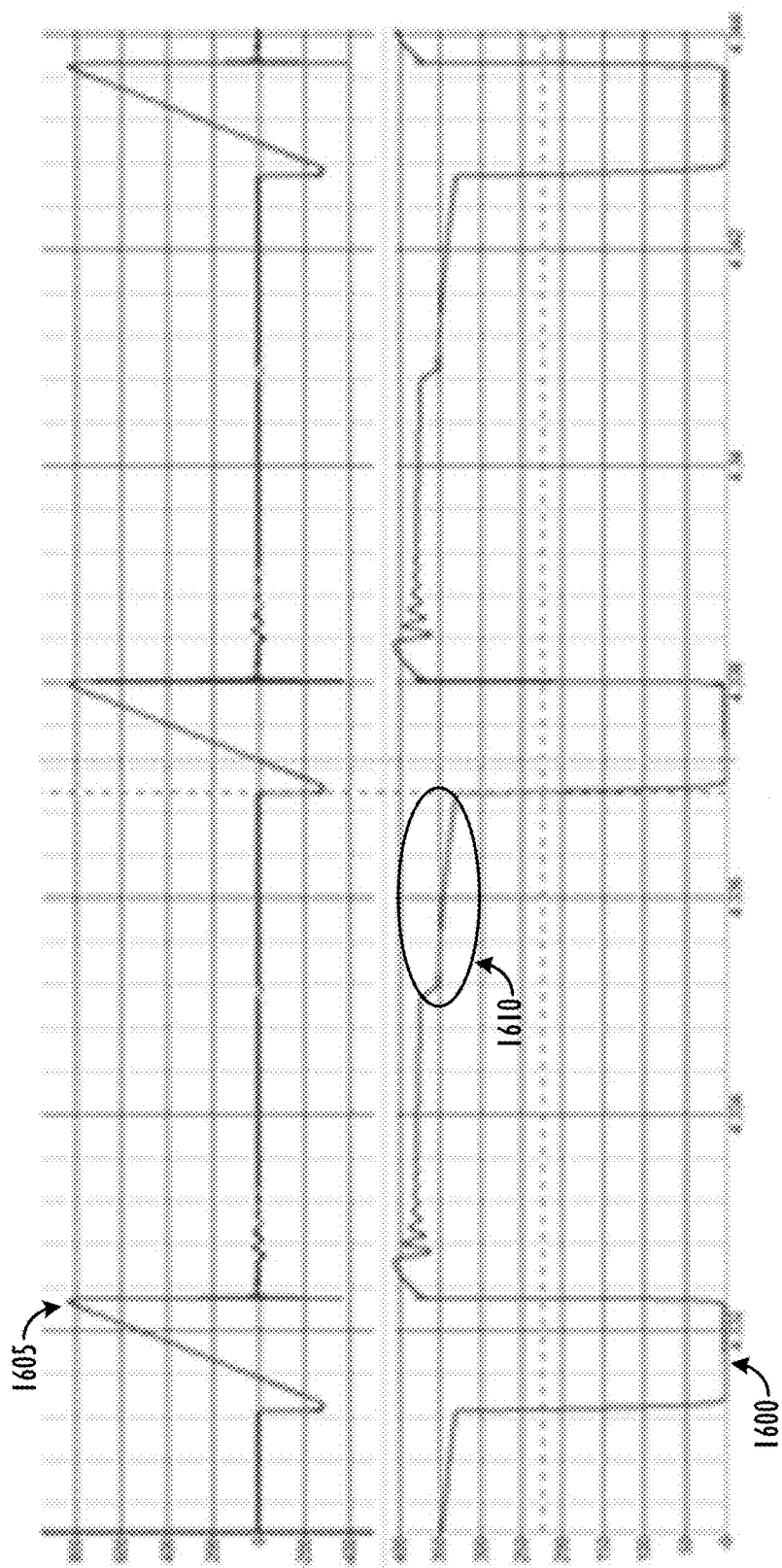
FIG. 16 shows waveforms illustrating the reverse current in power switch Q1 of the flyback converter of FIG. 2 operating in a fixed frequency mode.

Referring now to FIG. 16, waveforms illustrating the reverse current in power switch Q1, which has discharged the reflected capacitance at its drain node, are shown. In particular, Vds Q1 (waveform 1600), and IdQ1, i.e., the current flowing through the power switch Q1 (waveform 1605), show the reverse current in power switch Q1, which has discharged the reflected capacitance at its drain node. The ringing during dead time, as is commonly seen in DCM flyback converters, is eliminated, as is illustrated by the sloping, flat area 1610 in waveform 1600.

Figure 17:
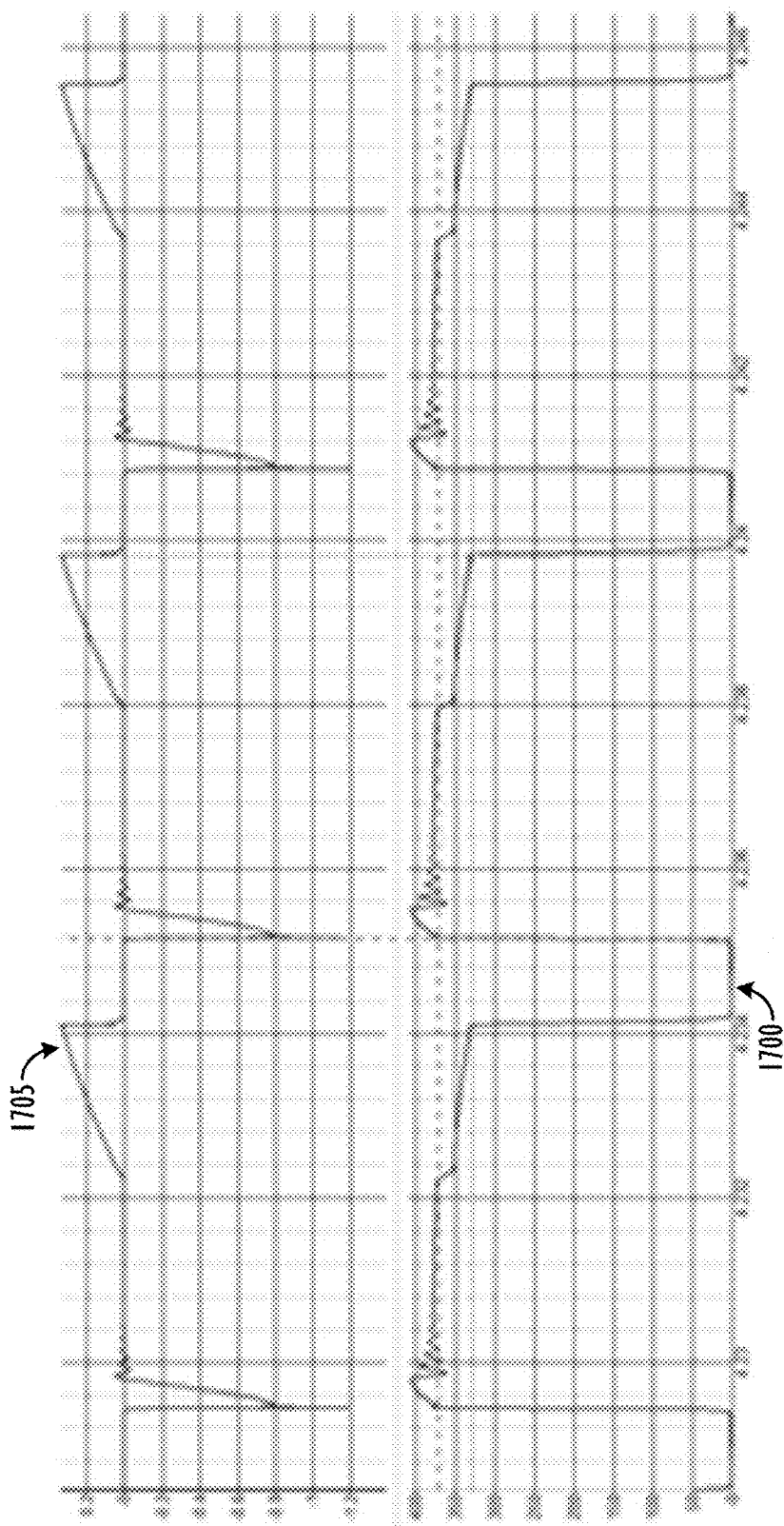
FIG. 17 shows waveforms illustrating current transfer to the active clamp at the time of turn off of power switch Q1 of the flyback converter of FIG. 2 operating in a fixed frequency mode, as well as the discharge current after the end of the flyback period or during the dead time.

Referring now to FIG. 17, waveforms illustrating current transfer to the active clamp at the time of turn off of power switch Q1, as well as discharge current after the end of the flyback period or during the dead time are shown. Vds_Q1 is represented by waveform 1700, and Id_Q2, i.e., the current flowing through the clamp switch Q2, is represented by waveform 1705. FIGS. 5 through 7 look similar to FIGS. 15 through 17, but the initiation of the gate drive circuitry for power switch Q1 is dictated by different principles. In FIGS. 15 through 17, power switch Q1 turns on as dictated by a fixed time (i.e., at a fixed frequency), whereas, in FIGS. 5 through 7, the turn on of power switch Q1 is dictated by a different set of rules that provide for variable frequency operation.

Figure 18:
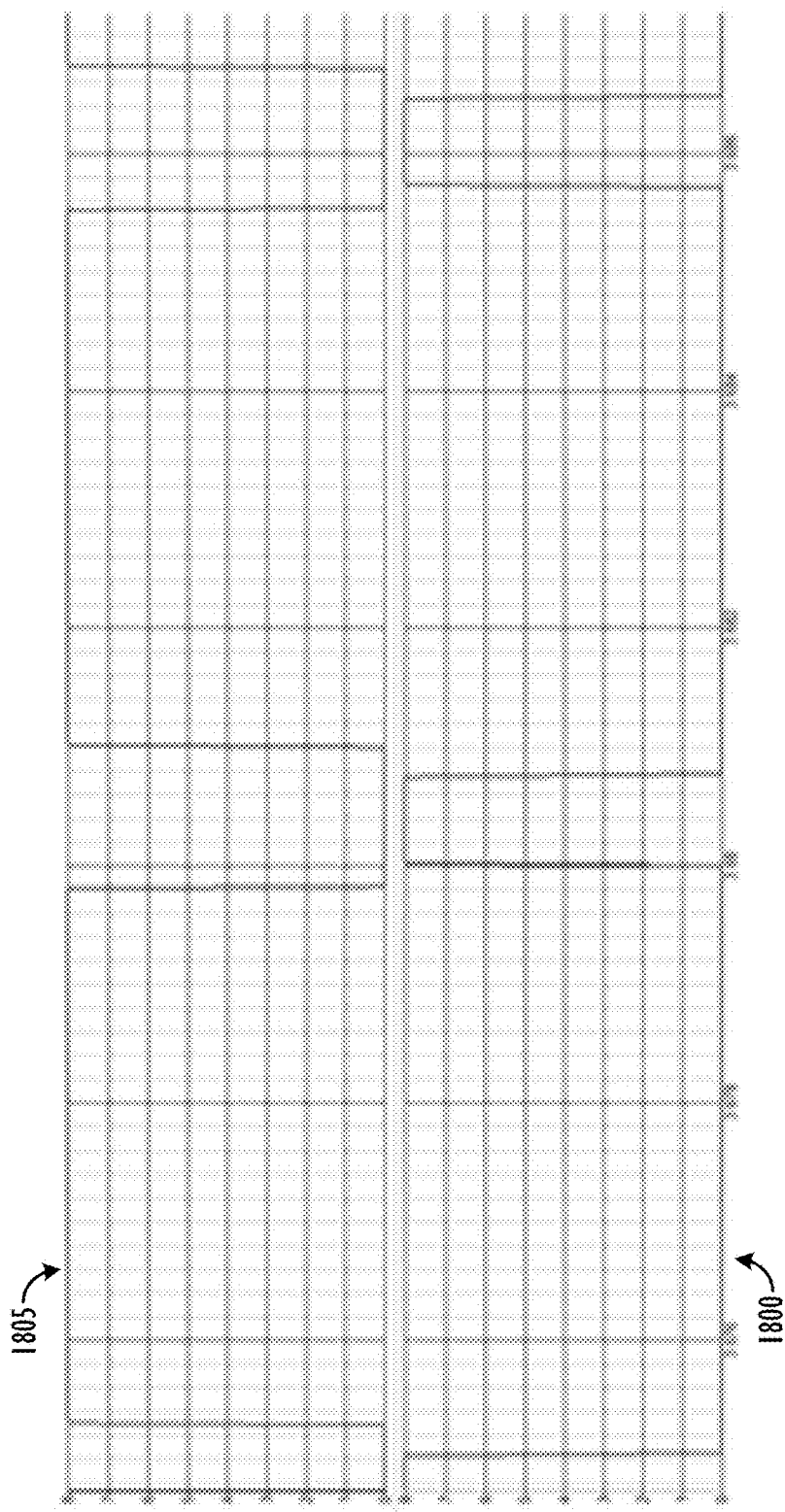
FIG. 18 shows waveforms illustrating the delays between the two PWM drive signals for power switch Q1 and clamp switch Q2 of the flyback converter of FIG. 2.

Referring now to FIG. 18, waveforms illustrating the delays between the two PWM drive signals for power switch Q1 and clamp switch Q2 are shown. The power switch Q1 drive signal is represented by waveform 1800, and the clamp switch Q2 drive signal is represented by waveform 1805. As shown in FIG. 18, there is some delay between the periods of time during which the power switch Q1 drive signal is high and the time period during which the clamp switch Q2 drive signal is high.

Adaptive Control of Fixed Frequency Operation Embodiments

According to some embodiments, the performance of the high efficiency, fixed frequency DCM flyback converters described above may be improved by using the adaptive capabilities of digital control circuitry—as opposed to the static nature of analog control circuitry—while still retaining the benefits of fixed frequency operation.

Digital control brings significant benefits over analog control, e.g., due to its ability to adapt to operating conditions, implement non-linear control, and configure the performance for best results. Analog control, on the other hand, is static and handles all the conditions as set in the fixed design. The use of digital control in the high-end power systems such as computing or telecommunication devices is quite common today. The continuous cost reduction of microprocessors is making it attractive in consumer applications. Even low power battery chargers or USB Adapters may benefit from digital control. Thus, the embodiments described below teach how the performance of the fixed frequency DCM flyback converters may be optimized on-the-fly, i.e., by detecting certain operating conditions using digital control, in order to achieve higher levels of performance.

The "adaptive control" embodiments of an intelligent optimizer may be applied to the operation of a fixed frequency DCM flyback converter, as discussed above and shown in exemplary form in circuit 200 of FIG. 2. As described above, power switch Q1 and clamp switch Q2 operate substantially in a complementary mode, except for short delays during switching transitions. The detailed operation of the circuit may be summarized in the following exemplary operation cycle:

1.) The on time of power switch Q1 is controlled by output regulation mechanism, and energy is stored in the primary inductance of transformer during its on time.
2.) When power switch Q1 turns off, leakage inductance energy is delivered to snubber capacitors C1 and C3, and the rest of the stored energy is delivered to the output during the flyback period.
3.) Upon charging, snubber capacitors C1 and C3 are substantially disconnected from the primary winding of the transformer during energy discharge.
4.) Upon depletion of all energy in the transformer, the flyback voltage across the primary windings starts to fall, and when it equals the voltage across each of the snubber capacitors, C1 and C3, the leakage energy is transferred to the primary inductance due to the reverse current built in it.
5.) After transferring all the leakage energy stored in snubber capacitors to the primary, the reverse current continues to build during the on-time of clamp switch Q2.
6.) Clamp switch Q2 is turned off at a pre-determined time before the next turn-on cycle of power switch Q1, and the reverse energy stored in the primary winding is returned to the input source through the conduction of the body diode of power switch Q1.
7.) In the next cycle, power switch Q1 may be turned on when the voltage across it is substantially zero, and the operation may be repeated.

In the above exemplary operation cycle, it should be noted that recovering the leakage inductance energy stored in the snubber capacitors is one aspect to achieving higher efficiency. However, after accomplishing that, transferring excessive energy stored in the snubber capacitors back to input source may cause additional power loss, e.g., due to current circulation. Although the embodiments described herein provide significantly higher efficiency than traditional DCM flyback converters, there are still opportunities to further improve efficiencies using the so-called adaptive control techniques described in further detail below.

As explained above, the current flows from snubber capacitors in to the primary winding, through clamp switch Q2 in the reverse direction only during the dead time of the switching cycle. As mentioned above, dead time can be defined as the time when the energy is neither being stored in the primary inductance nor it is being transferred to the output. In other words, it is the period of time when the inductor is completely depleted of energy.

This dead time increases as the output load decreases or the input voltage increases. For example, in a DCM flyback converter for a given fixed output load, the dead time at 300V DC input will be much higher than the same at 150V DC input. And, for a given fixed input voltage, the dead time at, e.g., a 25% output load will be much higher than it is at a 100% output load level.

During the dead time, the current continues to build in reverse direction and causes recirculation of energy. The adaptive control embodiments disclosed herein teach how to control the time delay between the instance of turn-off of clamp switch Q2 and turn-on of power switch Q1. The turn-on of power switch Q1 is fixed and dictated by the switching timer. Hence, according to some embodiments, the turn-off timing of clamp switch Q2 may be adaptively controlled to achieve improvement, while still maintaining the zero voltage turn on characteristic of the fixed frequency converter embodiments described above.

As explained in the context of the fixed frequency embodiments described above, the charge stored in snubber capacitors C1 and C3 is a combination of reflected output voltage and leakage energy.

The reflected secondary voltage across the primary winding during flyback period (V_OR) may be calculated as:

$$V\_OR = (Np/Ns) \times (Vout + Vf\_D1) \quad \text{(Eqn. 1)},$$

where Np/Ns is the transformer turns ratio, and Vf_D1 is the forward voltage drop of the output rectifier diode. Each of C1 and C3 is charged to half of this voltage level and, in addition, there may be higher voltage charge on it due to leakage energy.

Since the recovery of leakage energy is one aspect that provides higher performance, both C1 and C3 may be allowed to discharge to the voltage level of ½ V_OR (or whatever the desired threshold has been selected to be). The amount of discharge below this level is responsible for non-essential circulating current.

If various parameters are available to a controller having the capability to do computations, such as a microcontroller or a Digital Signal Processor (DSP), then the efficiency can be improved through the further optimization techniques described herein.

Many flyback controllers use peak current mode control. In such control schemes, the on time is not set by the control loop; rather, a peak current limit is set. Thus, the controller does not have knowledge of the PWM on time, and an analog comparator determines the termination of on time. However, the PWM on time may be predicted through computations to serve that purpose. For example, if the set peak current limit, the primary inductance, and the input voltage are known, then the on time may be computed by following equation:

$$T\_on = (Ipk \times Lp) \div Vin \qquad \text{(Eqn. 2)}.$$

If a reference voltage is used to set the threshold of peak current limit comparator, then the set peak current limit may be computed from this variable reference level that is set by a control loop and a fixed value of a current sense resistor. A similar computation is possible if a current transformer is used with knowledge of its turns ratio and current-to-voltage design characteristics. If a voltage mode control technique is used for regulation, then T_on may be directly known.

Similarly, the transformer discharge time (T_dis) may be computed by an inductor volt-second balance equation, as follows:

$$T\_dis = (Vin \times T\_on) \div V\_OR \qquad \text{(Eqn. 3)}.$$

Based on the set fixed switching frequency (Fsw), the total switching period, T is known. Subtracting T_on and T_dis from the total period, T, gives the value of the dead time:

$$T\_dead = T - (T\_on + T\_dis) \qquad \text{(Eqn. 4)}.$$

All the transfer of leakage inductance energy stored in snubber capacitors C1 and C3 takes place during this dead time.

The objective of these adaptive control embodiments is to improve efficiency by preventing excessive recirculation of energy. This does not require extremely accurate computations. Once the basic objective is met, the performance can always be fine-tuned through design calibration.

For most purposes, it may initially be assumed that the average voltage across each snubber capacitor C1 and C3 is ½ V_OR. In reality, this voltage will always be slightly higher than this value due to leakage inductance energy, but this assumption plays on the safer side.

During the on time of clamp switch Q2, this voltage, ½ V_OR, is applied across the discharged primary winding to build the current in the reverse direction. When clamp switch Q2 is turned off, the voltage polarity across the primary winding changes. After the voltage across power switch Q1 falls below zero with its intrinsic body diode conducting, the voltage across the primary winding is substantially equal to the input voltage (Vin), and the amount of time required to transfer all energy stored in the primary inductance back to the input source is dictated by the volt-second balance equation (e.g., Eqn. 3). The power loss due to recirculation of energy is at minimum if the reverse current in the primary falls to zero at just the instant of initiation of the next turn on instance of power switch Q1. Thus, the objective of these embodiments is to accomplish the transfer of the stored leakage energy in C1 and C3 plus minimum possible extra energy, back to input source just when the next turn on cycle of power switch Q1 initiates. This is achieved in following way:

Divide the time period, T_dead, into two parts, say T1 and T2. Time T1 is the time duration when energy from C1 and C2 is being transferred to the primary inductance, and time T2 is the remaining time before the next PWM cycle initiates. For achieving the objective of the invention, T2 must be equal to T_dead minus T1. This is achieved by turning off clamp switch Q2 at a time instance governed by following volt-second balance equations:

$$T1 \times \tfrac{1}{2}V\_OR = T2 \times Vin \qquad \text{(Eqn. 5)}$$

or $$T1 = [(T\_dead - T1) \times Vin] \div \tfrac{1}{2}V\_OR \qquad \text{(Eqn. 6)}$$

This gives the values of times T1 and T2 through mathematical computations. It is this time period T2 that decides the instance when clamp switch Q2 needs to be turned off. Based on the above computations, the clamp switch Q2 is turned off at an instance that precedes the end of total switching period, T, by time period T2. It should be noted that it takes a finite resonant time for the drain node of power switch Q1 to fall down to zero due to the total parasitic capacitance at that node. This time is neglected in above computation. However, that time delay can be computed once the parasitic elements are known, i.e., after building the prototype unit. Time period T1 is always kept such that it is marginally higher than what is needed to achieve the above-stated objectives. This eliminates the possibility of non-ZVS or 'hard switching' operation.

To meet the above-stated objectives, according to some embodiments, the DSP has access to the following parameters, either as fixed pre-set values or variable parameters sensed, directly or indirectly, through its analog-to-digital converter (ADC) inputs:

1.) Switching frequency/Switching period (T)—this is easily achieved if the DSP is performing the entire control or is fed with this information;
2.) Input voltage (Vin);
3.) Reflected secondary voltage (V_OR);
4.) Primary inductance (Lp); and
5.) On time of power switch Q1 (T_on).

Using the disclosed techniques, the DSP may then control the optimized instance of turn off for clamp switch Q2 to reduce losses caused by circulating currents. The improvements achieved by this optimization are quite significant at lower loads and also at high input voltage, where the dead time is significantly longer, while maintaining fixed frequency operation.

Several alternative methods of achieving the same adaptive control functionality are now described below.

Alternative 1.) Calibration of the control time: After building a prototype, it can be type tested to find the appropriate delay time T2, as described above. This delay, once calibrated with respect to input voltage and output load may be set in a "look-up" table. The controller may then choose the instance of clamp switch Q2 turn-off based on output load and input voltage by using corresponding values set in look up table. This eliminates the 'on-the-fly' computations above and allows the use of cheaper digital controllers or a mixed signal controller.

Alternative 2.) Measure reverse current: It is also possible to measure the duration of reverse current that flows through the power switch Q1 after it is turned on. This can be sensed either by sensing the polarity of current or polarity of voltage across power switch Q1. The voltage across drain to source would be negative during such reverse current circulation time. After sensing this, the delay time T2 may be gradually changed in discrete steps, while continuing to monitor the same parameters, until the optimum delay, T2 (as described above), is achieved. This also essentially achieves the same performance as described in the adaptive control embodiments described above and may also allow for the use of a lower cost controller.

Intelligent Frequency Adaptation Embodiments

The intelligent frequency adaptation embodiments described below offer a balance between the benefits of variable frequency and fixed frequency embodiments described above. The variable frequency embodiments employ a methodology of achieving high efficiency and low common mode noise in a discontinuous mode flyback converter, which operates with variable frequency. The variable frequency converter embodiments may change operating frequency based on output load and input voltage. As mentioned above, such operation is not acceptable in certain applications, such as mobile phone and tablet devices, due to multi-touch requirements, wherein common mode noise in certain frequency bands needs to be very low. This purpose may be better served by using a converter constructed according to the fixed frequency embodiments described above. However, the fixed frequency embodiments still potentially suffer from undesired circulation losses at lower loads than converters constructed using the variable frequency embodiments.

Thus, the so-called "intelligent frequency adaptation" embodiments described below comprise techniques that force DCM flyback converters to operate at a substantially fixed frequency over a certain input and output conditions. This fixed operating frequency may then intelligently change to another fixed frequency for a different range of input and output conditions—while avoiding the frequency bands that are undesired for given system requirements. In other words, such intelligent frequency adaptation embodiments may be described as having a "partially-fixed" frequency.

Systems that are sensitive to noise in certain frequency bands may require the power source to attenuate noise in that part of the spectrum. In several situations, the power supply designer has very few choices of operating frequency and topologies that may be used. Essentially, variable frequency topologies, such as LLC resonant or quasi-resonant flyback converters, may not be used without the significant limitation of avoiding the frequency bands) of interest. In such situations, the operating frequency may be selected such that the fundamental frequency and its first few harmonics do not fall in any of the frequency band(s) of interest.

While operating according to the fixed frequency embodiments described above, the dead times becomes too long at lower output loads and higher input voltages. This causes higher circulation of undesired energy, and efficiency can degrade. The "intelligent frequency adaptation" embodiments described below may increase the frequency of operation, e.g., in integral multiples of the base frequency, when the converter operates at lower loads and/or higher input voltages.

The circuit and operation of the "intelligent frequency adaptation" embodiments are essentially the same as the circuit described above with reference to FIG. 2, and the seven operational steps described above with reference to the "adaptive control" embodiments. It should be noted, however, that recovering the leakage inductance energy stored in snubber capacitors is a one aspect to achieving higher efficiency. However, after accomplishing that, transferring excessive energy stored in the snubber capacitors back to the input source may cause additional power loss due to current circulation. Further, this excessive circulation of current is proportional to dead time, which increases at lower output loads and/or higher input voltage. Although the series-parallel mode active clamp DCM flyback converters disclosed herein achieve significantly higher efficiency than traditional DCM flyback converters, there is still opportunity to further improve efficiency using the intelligent frequency adaptation embodiments described below.

In one example, a typical power converter constructed using the fixed frequency operational concepts described above may operate at a fixed frequency of Fsw1. The input power stored in the primary inductor may then be given by following equation:

$$P\text{in} = 0.5 \times Lp \times Ip^2 \times Fsw1 \qquad \text{(Eqn. 7)},$$

where Lp is the primary inductance and Ip is the peak primary current.

Thus, for such a converter, which operates at a fixed frequency in DCM, the peak current remains substantially constant for a given fixed load at any input voltage. And, in such conditions, the transformer reset time remains the same, but the on time for power switch Q1 will increase at lower input voltages. Thus, the dead time is much smaller at low input voltages. The converter may thus be optimized for DCM operation at the lowest input voltages, such that circulating current losses are minimized.

However, at higher input voltages, the dead time increases and thus circulation losses also increase. In the "intelligent frequency adaptation" embodiments, a fixed operational frequency may be chosen such that it fulfills all the requirements of a DCM flyback converter over the entire input range. All the principals of design as discussed above in reference to FIG. 2 and the fixed frequency embodiments may be applied in the design of the intelligent frequency adaptation converter embodiments described here. During operation, the dead time may be monitored, preferably through digital circuits. This can be easily achieved if such power converters are controlled by a microprocessor or a DSP.

When the dead time exceeds a certain pre-set limit, Tdead1, the converter may be configured to instantly begin operating at twice the switching frequency from the next switching period. However, since the converter is operating in regulation mode, its peak current command may be set by a current reference commanded by the error amplifier. To ensure there is no glitch on the output, the current limit level may also be reduced to the amplitude of sqrt(0.5) of the actual value commanded by the error amplifier. This is further elaborated using the power equation:

$$P\text{in} = 0.5 \times Lp \times Ip^2 \times Fsw1 \qquad \text{(Eqn. 8)}.$$

Next, the converter may commence switching at twice the frequency, i.e., at a frequency, Fsw2, that equals (Fsw1×2). Thus, to keep the power constant, the value of $Ip^2$ must be reduced to half, or the value of Ip must be reduced to sqrt(0.5), i.e., approximately 0.707 times the peak current level, before such frequency change. This allows keeping the power at an identical level, and thus there is no glitch on the output. The error amplifier may thus continue to work at same level without even knowing that such transition has taken place.

When output load increases and the dead time reduces to a preset value lower than Tdead2, the operating frequency may again be halved to the original value of Fsw1, and peak current limit level may be restored to original value.

One exemplary control sequence for adjusting the switching period based on the dead time of the power converter may be summarized as follows:

1.) Start the converter with a fixed base frequency, Fsw1;
2.) Monitor the dead time, Tdead, during the operation;
3.) When Tdead is greater than first set reference value, Tdead1, take the following two actions (i.e., actions 3a. and 3b., below) simultaneously at the next clock cycle:
   a.) Multiply the set switching period by 0.5, which effectively doubles the switching frequency; and
   b.) Multiply the error amplifier signal used as reference for the current limit comparator by sqrt(0.5), i.e., 0.707;
4.) Continue to monitor dead time during the operation at the new switching frequency until the dead time becomes lower than another set reference, Tdead2. At that time, take following two actions (i.e., actions 4a. and 4b., below) at the beginning of next clock cycle:
   a.) Multiply the set switching period by 2, which effectively halves the switching frequency, taking it back to original value; and
   b.) Multiply the error amplifier signal used as reference for the current limit comparator by 1.

There is no specific limit as to how many frequency change steps may be implemented, as it may be dictated by requirements of specific applications. For example, the frequency may be switched only between two values, i.e., the base frequency and then twice the frequency, accompanied by corresponding changes in the current limit command levels, as described below. It is also possible to implement even more frequency changes, if so desired. It should be noted that it is not necessary to change the frequency exactly by a factor of two. The main operating frequency, Fsw1, may be changed to any other frequency, Fsw2, if the converter can operate in DCM mode at such other frequency.

A general guideline that may be followed according to some embodiments is that, when the operating switching frequency is changed from a first value of Fsw1 to a second value Fsw2, the current limit reference of the peak current mode comparator may be multiplied by a value equal to sqrt(Fsw1÷Fsw2). This is explained further through an example below.

If the frequency is changed from Fsw1 to Fsw2 when dead time exceeds a preset value, and Fsw2 is set to three times the value of Fsw1, then the current limit level may be changed from Ip1 to Ip2=[Ip1×sqrt(⅓)]=0.577×Ip1 of the level before frequency change. The same principal may be applied when frequency is reduced due to an increase in load, i.e., upon reaching a second preset level of dead time.

Several alternative methods of implementing the intelligent frequency adaptation embodiments are also possible, which are discussed in further detail below:

1.) When a digital controller is used, a multiplier may be used to change the value of the operating current limit upon a change in frequency, as explained in the embodiment above. This ensures that the error amplifier experiences minimum disturbance. This may be achieved through digital computations and multiplication.
2.) When analog control is used, a resistance divider may be switched using a MOSFET or transistor switch to achieve the same purpose as a multiplier. The ratio of resistance is chosen to achieve the desired multiplication.
3.) The preferred embodiment described above explains the method of implementation for a peak current mode DCM flyback converter. If a voltage mode control is used, then the multiplier can be used in same way, but, in this case, it may be compared with a fixed ramp, instead of the primary current.
4.) If voltage mode control is used through digital control, then the on time of power switch Q1 may be changed with the change in frequency, while keeping the duty cycle the same.
5.) Rather than applying a multiplier to the error signal, it is also possible to apply the multiplier to the current sense signal to achieve same result. Alternately, a proportional equivalent comparator may also be used for the current sense signal instead of the error reference signal.

EXAMPLES

The following examples pertain to additional embodiments.

Example 1 is a power conversion apparatus, comprising: a transformer, wherein the transformer has a primary winding and a secondary winding; a first switch coupled to the primary winding so as to control the flow of current through the primary winding; a second switch coupled to the primary winding, so as to control the flow of current through an active resonant clamp circuit, wherein the active resonant clamp circuit is configured to absorb leakage energy from the primary winding, and comprises: a first capacitor coupled to the primary winding; a second capacitor coupled to the primary winding; and a first diode connected in series between the first capacitor and the second capacitor; and a controller coupled to the first switch and the second switch, configured to: switch the first switch on, so as to store energy in the primary winding of the transformer; switch the first switch off, so as to charge the first and second capacitors in series; disconnect the first and second capacitors from the primary winding of the transformer once all leakage inductance energy has been transferred from the transformer to the first and second capacitors, so as to begin to discharge the first and second capacitors in parallel; switch the second switch off at a predetermined time interval or when the voltage across the first and second capacitors each falls to a predetermined voltage level; and switch the first switch on, so as to achieve zero voltage switching.

Example 2 includes the subject matter of example 1, wherein the second switch is configured to be turned on when current is flowing through its body diode.

Example 3 includes the subject matter of example 1, wherein the value of the first capacitor is equal to the value of the second capacitor.

Example 4 includes the subject matter of example 1, wherein the first and second capacitors are configured to be disconnected from the primary winding of the transformer due to the presence of the first diode.

Example 5 includes the subject matter of example 1, wherein the first diode is configured to block any reverse current from flowing through the second switch back into the primary winding of the transformer.

Example 6 includes the subject matter of example 1, wherein the predetermined voltage level comprises half of an output reflected voltage.

Example 7 includes the subject matter of example 6, wherein the second switch is configured to be switched off when there is a first predetermined minimum amount of reverse current in the primary winding of the transformer.

Example 8 includes the subject matter of example 7, wherein the transfer of leakage energy stored in the first and second capacitors to the primary winding of the transformer is started only after all the energy stored in the transformer is delivered to the load.

Example 9 is a method of operating a power conversion circuit comprising a transformer, first and second capacitors, first and second switches, and a controller operating the first and second switches to produce a regulated output voltage for delivery to a load in an output system, the method comprising: switching the first switch on, so as to store energy in a primary winding of the transformer; switching the first switch off, so as to charge the first and second capacitors in series; disconnecting the first and second capacitors from the primary winding of the transformer once all leakage inductance energy has been transferred from the transformer to the first and second capacitors, so as to begin to discharge the first and second capacitors in parallel; switching the second switch off when the voltage across the first and second capacitors each falls to a predetermined voltage level; and switching the first switch on, so as to achieve zero voltage switching.

Example 10 includes the subject matter of example 9, wherein the second switch is turned on when current is flowing through its body diode.

Example 11 includes the subject matter of example 9, wherein the value of the first capacitor is equal to the value of the second capacitor.

Example 12 includes the subject matter of example 9, wherein the first and second capacitors are disconnected from the primary winding of the transformer due to the presence of a first diode connected in series between the first and second capacitors.

Example 13 includes the subject matter of example 9, wherein a first diode connected in series between the first and second capacitors blocks any reverse current from flowing through the second switch back into the primary winding of the transformer.

Example 14 includes the subject matter of example 9, wherein the predetermined voltage level comprises half of an output reflected voltage.

Example 15 includes the subject matter of example 14, wherein the second switch is switched off when there is a first predetermined minimum amount of reverse current in the primary winding of the transformer.

Example 16 includes the subject matter of example 9, wherein the transfer of leakage energy stored in the first and second capacitors to the primary winding of the transformer is started after all the energy stored in the transformer is delivered to the load.

Example 17 is a method of operating a power conversion circuit comprising a transformer, first and second capacitors, first and second switches, and a controller operating the first and second switches to produce a regulated output voltage for delivery to a load in an output system, the method comprising: switching the first switch on at a predetermined time interval, so as to store energy in a primary winding of the transformer; switching the first switch off, so as to charge the first and second capacitors in series; switching the second switch on when current is flowing through its body diode; disconnecting the first and second capacitors from the primary winding of the transformer once all leakage inductance energy has been transferred from the transformer to the first and second capacitors, so as to begin to discharge the first and second capacitors in parallel; and switching the second switch off a predetermined amount of time before the next predetermined switching on of the first switch, wherein the amount of time is predetermined so as to achieve zero voltage switching of the first switch.

Example 18 includes the subject matter of example 17, wherein the timing of switching the first switch off is based, at least in part, on one or more of the following values: an error signal value, an output loading value, and an input voltage value.

Example 19 includes the subject matter of example 17, wherein energy stored in the first and second capacitors is retained when power is being delivered to the load.

Example 20 includes the subject matter of example 17, wherein the transfer of leakage energy stored in the first and second capacitors to the primary winding of the transformer is started after all the energy stored in the transformer is delivered to the load.

Example 21 is a power conversion apparatus, comprising: a transformer, wherein the transformer has a primary winding and a secondary winding; a first switch coupled to the primary winding so as to control the flow of current through the primary winding; a second switch coupled to the primary winding, so as to control the flow of current through an active resonant clamp circuit, wherein the active resonant clamp circuit is configured to absorb leakage energy from the primary winding, and comprises: a first capacitor coupled to the primary winding; a second capacitor coupled to the primary winding; and a first diode connected in series between the first capacitor and the second capacitor; and a controller coupled to the first switch and the second switch.

Example 22 includes the subject matter of example 21, wherein the value of the first capacitor is equal to the value of the second capacitor.

Example 23 includes the subject matter of example 21, wherein the value of the first capacitor is not equal to the value of the second capacitor.

Example 24 includes the subject matter of example 21, wherein the first and second capacitors are disconnected from the primary winding of the transformer due to the presence of the first diode.

Example 25 includes the subject matter of example 21, wherein the first diode is configured to block any reverse current from flowing through the second switch back into the primary winding of the transformer.

Example 26 includes the subject matter of example 21, wherein the second switch is configured to be switched off when a voltage across the first and second capacitors each falls to a predetermined voltage level.

Example 27 includes the subject matter of example 26, wherein the predetermined voltage level comprises a level that is half of the output reflected voltage.

Example 28 includes the subject matter of example 26, wherein the predetermined voltage level comprises a level that is greater than half of the output reflected voltage.

Example 29 includes the subject matter of example 26, wherein the predetermined voltage level comprises a level that is less than half of the output reflected voltage.

Example 30 is a method of operating a power conversion circuit comprising a transformer, first and second capacitors, first and second switches, and a controller operating the first and second switches to produce a regulated output voltage for delivery to a load in an output system, the method comprising: switching the first switch on at a predetermined time interval, so as to store energy in a primary winding of the transformer; switching the first switch off, so as to charge the first and second capacitors in series; switching the second switch on when current is flowing through its body diode; disconnecting the first and second capacitors from the primary winding of the transformer once all leakage inductance energy has been transferred from the transformer to the first and second capacitors, so as to begin to discharge the first and second capacitors in parallel; and switching the second switch off at a first adaptive amount of time before the next switching on of the first switch, wherein the first adaptive amount of time is determined so as to achieve zero voltage switching of the first switch.

Example 31 includes the subject matter of example 30, wherein a timing of switching the first switch off is based, at least in part, on one or more of the following values: an error signal value, an output loading value, and an input voltage value.

Example 32 includes the subject matter of example 30, wherein energy stored in the first and second capacitors is retained when power is being delivered to the load.

Example 33 includes the subject matter of example 30, wherein the discharging of the first and second capacitors is started when a voltage across the primary winding equals a voltage across each of the first and second capacitors.

Example 34 includes the subject matter of example 30, wherein the first adaptive amount of time comprises an amount of time configured so that the next switching on of the first switch immediately follows the complete discharging of the first and second capacitors.

Example 35 includes the subject matter of example 30, wherein the first adaptive amount of time comprises an amount of time that is equal to the predetermined time interval minus an amount of time it takes to discharge the first and second capacitors.

Example 36 includes the subject matter of example 30, wherein the first adaptive amount of time comprises a calibrated value based, at least in part, on one or more characteristics of the power conversion circuit.

Example 37 includes the subject matter of example 30, wherein the first adaptive amount of time comprises an amount determined based, at least in part, on a measurement of a duration of reverse current flowing through the first switch after it is switched on.

Example 38 is a power conversion apparatus, comprising: a transformer, wherein the transformer has a primary winding and a secondary winding; a first switch coupled to the primary winding so as to control the flow of current through the primary winding; a second switch coupled to the primary winding, so as to control the flow of current through an active resonant clamp circuit, wherein the active resonant clamp circuit is configured to absorb leakage energy from the primary winding, and comprises: a first capacitor coupled to the primary winding; a second capacitor coupled to the primary winding; and a first diode connected in series between the first capacitor and the second capacitor; and a controller coupled to the first switch and the second switch, configured to: switch the first switch on at a predetermined time interval, so as to store energy in the primary winding of the transformer; switch the first switch off, so as to charge the first and second capacitors in series; disconnect the first and second capacitors from the primary winding of the transformer once all leakage inductance energy has been transferred from the transformer to the first and second capacitors, so as to begin to discharge the first and second capacitors in parallel; and switch the second switch off at a first adaptive amount of time before the next switching on of the first switch, wherein the first adaptive amount of time is predetermined so as to achieve zero voltage switching of the first switch.

Example 39 includes the subject matter of example 38, wherein a timing of switching the first switch off is based, at least in part, on one or more of the following values: an error signal value, an output loading value, and an input voltage value.

Example 40 includes the subject matter of example 38, wherein energy stored in the first and second capacitors is retained when power is being delivered to the load.

Example 41 includes the subject matter of example 38, wherein the discharging of the first and second capacitors is started when a voltage across the primary winding equals a voltage across each of the first and second capacitors.

Example 42 includes the subject matter of example 38, wherein the first adaptive amount of time comprises an amount of time configured so that the next switching on of the first switch immediately follows the complete discharging of the first and second capacitors.

Example 43 includes the subject matter of example 38, wherein the first adaptive amount of time comprises an amount of time that is equal to the predetermined time interval minus an amount of time it takes to discharge the first and second capacitors.

Example 44 includes the subject matter of example 38, wherein the first adaptive amount of time comprises a calibrated value based, at least in part, on one or more characteristics of the power conversion apparatus.

Example 45 includes the subject matter of example 38, wherein the first adaptive amount of time comprises an amount determined based, at least in part, on a measurement of a duration of reverse current flowing through the first switch after it is switched on.

Example 46 is a method of operating a power conversion circuit comprising a transformer, first and second capacitors, first and second switches, and a controller operating the first and second switches to produce a regulated output voltage for delivery to a load in an output system, the method comprising: switching the first switch on at a first adaptable switching frequency, so as to store energy in a primary winding of the transformer; switching the first switch off, so as to charge the first and second capacitors in series; switching the second switch on when current is flowing through its body diode; disconnecting the first and second capacitors from the primary winding of the transformer once all leakage inductance energy has been transferred from the transformer to the first and second capacitors, so as to begin to discharge the first and second capacitors in parallel; switching the second switch off a predetermined amount of time before the next switching on of the first switch, wherein the amount of time is predetermined so as to achieve zero voltage switching of the first switch; monitoring a dead time of the transformer; increasing the first adaptable switching frequency when the dead time exceeds a first predetermined threshold value; and decreasing the first adaptable switching frequency when the dead time is less than a second predetermined threshold value.

Example 47 includes the subject matter of example 46, wherein increasing the first adaptable switching frequency comprises increasing the first adaptable switching frequency by an integral factor.

Example 48 includes the subject matter of example 47, wherein the integral factor is two.

Example 49 includes the subject matter of example 46, wherein decreasing the first adaptable switching frequency comprises decreasing the first adaptable switching frequency by an integral factor.

Example 50 includes the subject matter of example 49, wherein the integral factor is two.

Example 51 includes the subject matter of example 46, further comprising decreasing a peak current limit level of the primary winding when the dead time exceeds the first predetermined threshold value.

Example 52 includes the subject matter of example 51, wherein decreasing a peak current limit level of the primary winding comprises decreasing a peak current limit level so as to maintain a constant output power level to the output system.

Example 53 includes the subject matter of example 46, further comprising increasing a peak current limit level of the primary winding when the dead time is less than the second predetermined threshold value.

Example 54 includes the subject matter of example 53, wherein increasing a peak current limit level of the primary winding comprises increasing a peak current limit level so as to maintain a constant output power level to the output system.

Example 55 includes the subject matter of example 46, wherein the first adaptable switching frequency is further configured to avoid frequency bands associated with common mode noise of an electronic device being charged by the power conversion circuit.

Example 56 is a power conversion apparatus, comprising: a transformer, wherein the transformer has a primary winding and a secondary winding; a first switch coupled to the primary winding so as to control the flow of current through the primary winding; a second switch coupled to the primary winding, so as to control the flow of current through an active resonant clamp circuit, wherein the active resonant clamp circuit is configured to absorb leakage energy from the primary winding, and comprises: a first capacitor coupled to the primary winding; a second capacitor coupled to the primary winding; and a first diode connected in series between the first capacitor and the second capacitor; and a controller coupled to the first switch and the second switch, configured to: switch the first switch on at a first adaptable switching frequency, so as to store energy in the primary winding of the transformer; switch the first switch off, so as to charge the first and second capacitors in series; disconnect the first and second capacitors from the primary winding of the transformer once all leakage inductance energy has been transferred from the transformer to the first and second capacitors, so as to begin to discharge the first and second capacitors in parallel; switch the second switch off a predetermined amount of time before the next switching on of the first switch, wherein the amount of time is predetermined so as to achieve zero voltage switching of the first switch; monitor a dead time of the transformer; increase the first adaptable switching frequency when the dead time exceeds a first predetermined threshold value; and decrease the first adaptable switching frequency when the dead time is less than a second predetermined threshold value.

Example 57 includes the subject matter of example 56, wherein increasing the first adaptable switching frequency comprises increasing the first adaptable switching frequency by an integral factor.

Example 58 includes the subject matter of example 57, wherein the integral factor is two.

Example 59 includes the subject matter of example 56, wherein decreasing the first adaptable switching frequency comprises decreasing the first adaptable switching frequency by an integral factor.

Example 60 includes the subject matter of example 59, wherein the integral factor is two.

Example 61 includes the subject matter of example 56, further comprising decreasing a peak current limit level of the primary winding when the dead time exceeds the first predetermined threshold value.

Example 62 includes the subject matter of example 61, wherein decreasing a peak current limit level of the primary winding comprises decreasing a peak current limit level so as to maintain a constant output power level to the output system.

Example 63 includes the subject matter of example 56, further comprising increasing a peak current limit level of the primary winding when the dead time is less than the second predetermined threshold value.

Example 64 includes the subject matter of example 63, wherein increasing a peak current limit level of the primary winding comprises increasing a current limit level so as to maintain a constant output power level to the output system.

Example 65 includes the subject matter of example 56, wherein the first adaptable switching frequency is further configured to avoid frequency bands associated with common mode noise of an electronic device being charged by the power conversion apparatus.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled.

The invention claimed is:

1. A method of operating a power conversion circuit comprising a transformer, first and second capacitors, first and second switches, and a controller operating the first and second switches to produce a regulated output voltage for delivery to a load in an output system, the method comprising:
   switching the first switch on at a first switching frequency, so as to store energy in a primary winding of the transformer;
   charging the first and second capacitors in series by switching the first switch off;
   switching the second switch on when current is flowing through a body diode of the second switch;
   discharging the first and second capacitors in parallel by switching the second switch off to disconnect the first and second capacitors from the primary winding of the transformer once all leakage inductance energy has been transferred from the transformer to the first and second capacitors;
   wherein the second switch is switched off at a first amount of time before the next switching on of the first switch, wherein the first amount of time is determined so as to achieve zero voltage switching of the first switch;
   wherein at least one of the first switching frequency and the first amount of time is adaptive.

2. The method of claim 1 wherein the first switching frequency is adaptive and the method further comprises:
   monitoring a dead time of the transformer;
   increasing the first adaptable switching frequency when the dead time exceeds a first predetermined threshold value; and
   decreasing the first adaptable switching frequency when the dead time is less than a second predetermined threshold value.

3. The method of claim 2, further comprising decreasing a peak current limit level of the primary winding when the dead time exceeds the first predetermined threshold value.

4. The method of claim 3, wherein decreasing a peak current limit level of the primary winding comprises decreasing the peak current limit level so as to maintain a constant output power level to the output system.

5. The method of claim 2, further comprising increasing a peak current limit level of the primary winding when the dead time is less than the second predetermined threshold value.

6. The method of claim 5, wherein increasing the peak current limit level of the primary winding comprises increasing a peak current limit level so as to maintain a constant output power level to the output system.

7. The method of claim 3, wherein the first switching frequency is adaptive and is selected to avoid frequency bands associated with common mode noise of an electronic device being charged by the power conversion circuit.

8. The method of claim 1, wherein the first amount of time is adaptive and a timing of switching the first switch off is based, at least in part, on one or more of the following values: an error signal value, an output loading value, and an input voltage value.

9. The method of claim 8, wherein the first amount of time is adaptive and is determined so that the next switching on of the first switch immediately follows complete discharging of the first and second capacitors.

10. The method of claim 1, wherein the discharging of the first and second capacitors is started when a voltage across the primary winding equals a voltage across at least one of the first and second capacitors.

11. The method of claim 1, wherein the first amount of time is adaptive and is determined based, at least in part, on a measurement of a duration of reverse current flowing through the first switch after the first switch is switched on.

12. A power conversion apparatus, comprising:
a transformer, wherein the transformer has a primary winding and a secondary winding;
a first switch coupled to the primary winding so as to control a flow of current through the primary winding;
a second switch coupled to the primary winding, so as to control the flow of current through an active resonant clamp circuit,
wherein the active resonant clamp circuit is configured to absorb leakage energy from the primary winding, and comprises:
a first capacitor coupled to the primary winding;
a second capacitor coupled to the primary winding; and
a first diode connected in series between the first capacitor and the second capacitor; and
a controller coupled to the first switch and the second switch, configured to:
switch the first switch on at a first switching frequency, so as to store energy in the primary winding of the transformer;
switch the first switch off, so as to charge the first and second capacitors in series;
disconnect the first and second capacitors from the primary winding of the transformer once all leakage inductance energy has been transferred from the transformer to the first and second capacitors, so as to begin to discharge the first and second capacitors in parallel; and
switch the second switch off at a first amount of time before the next switching on of the first switch, wherein the first amount of time is determined so as to achieve zero voltage switching of the first switch;
wherein at least one of the first switching frequency and the first amount of time is adaptive.

13. The power conversion apparatus of claim 12, wherein the first switching frequency is adaptive and the controller is further configured to:
monitor a dead time of the transformer;
increase the first adaptable switching frequency when the dead time exceeds a first predetermined threshold value; and
decrease the first adaptable switching frequency when the dead time is less than a second predetermined threshold value.

14. The power conversion apparatus of claim 13, wherein the controller is further configured to decrease a peak current limit level of the primary winding when the dead time exceeds the first predetermined threshold value.

15. The power conversion apparatus of claim 14, wherein the controller is further configured to peak a current limit level so as to maintain a constant output power level to an output system.

16. The power conversion apparatus of claim 13, wherein the controller is further configured to increase a peak current limit level of the primary winding when the dead time is less than the second predetermined threshold value.

17. The power conversion apparatus of claim 16, wherein the controller being configured to increase a peak current limit level of the primary winding comprises the controller being configured to increase the peak current limit level so as to maintain a constant output power level to an output system.

18. The power conversion apparatus of claim 13, wherein the first switching frequency is adaptable and is selected to avoid frequency bands associated with common mode noise of an electronic device being powered by the power conversion apparatus.

19. The power conversion apparatus of claim 12, wherein the first amount of time is adaptive and a timing of switching the first switch off is based, at least in part, on one or more of the following values: an error signal value, an output loading value, and an input voltage value.

20. The power conversion apparatus of claim 12, wherein energy stored in the first and second capacitors is retained when power is being delivered to a load in an output system.

21. The power conversion apparatus of claim 12, wherein the first amount of time is adaptive and is determined so that the next switching on of the first switch immediately follows the complete discharging of the first and second capacitors.

22. The power conversion apparatus of claim 12, wherein the first amount of time is adaptive and is determined based, at least in part, on a measurement of a duration of reverse current flowing through the first switch after the first switch is switched on.

* * * * *